Oct. 14, 1952 T. L. DIMOND 2,614,176
ELECTRONIC INDUCTION NUMBER GROUP TRANSLATOR
Filed May 6, 1950 16 Sheets-Sheet 1

NUMBER GROUP
CIRCUIT

INVENTOR.
T. L. DIMOND
BY William F. Simpson.
ATTORNEY

Oct. 14, 1952     T. L. DIMOND     2,614,176
ELECTRONIC INDUCTION NUMBER GROUP TRANSLATOR
Filed May 6, 1950     16 Sheets-Sheet 5

INVENTOR.
T. L. DIMOND
BY William F. Simpson
ATTORNEY.

Oct. 14, 1952       T. L. DIMOND       2,614,176
ELECTRONIC INDUCTION NUMBER GROUP TRANSLATOR
Filed May 6, 1950       16 Sheets-Sheet 8

MARKER CIRCUIT     FIG.8

INVENTOR.
T. L. DIMOND
BY William F. Simpson
ATTORNEY.

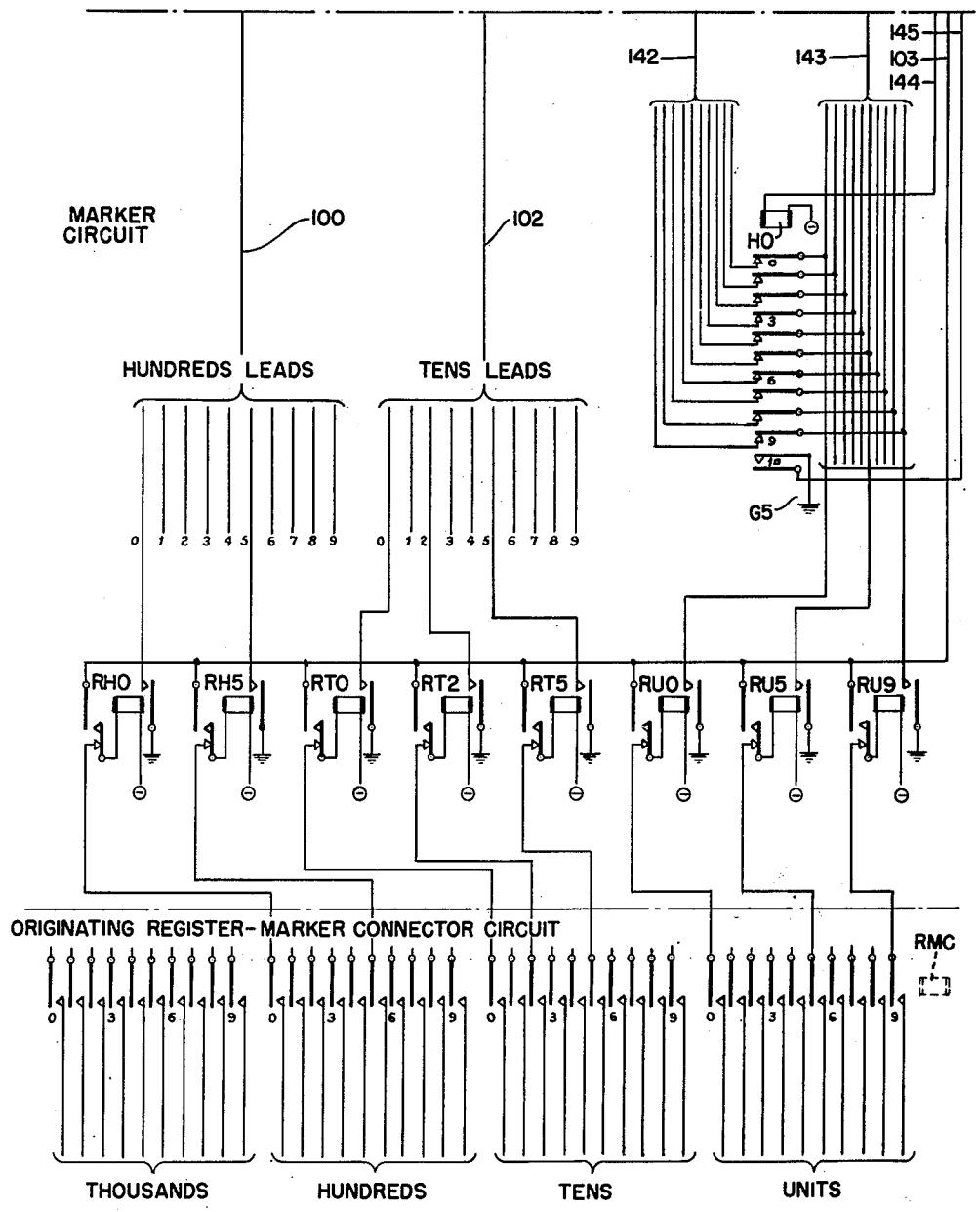
FIG. II

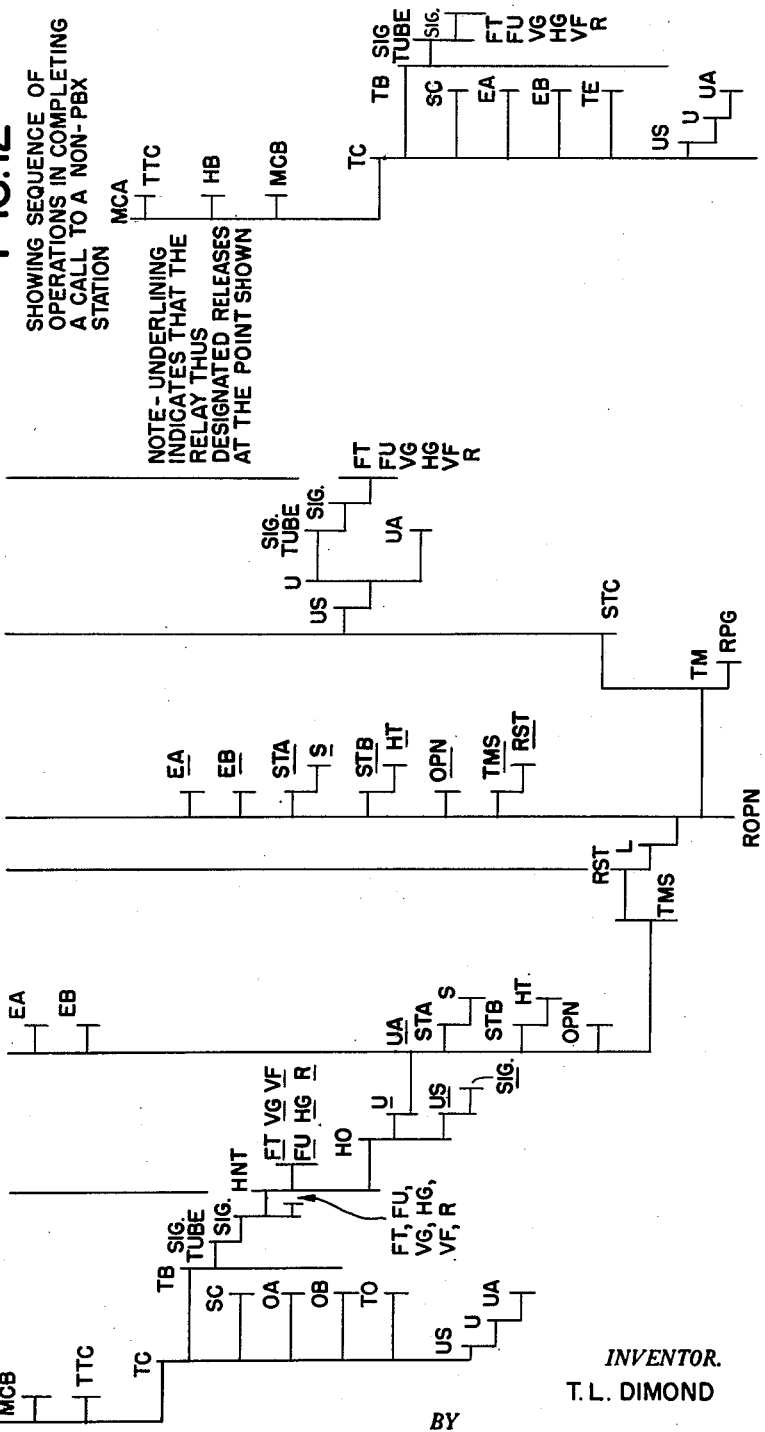

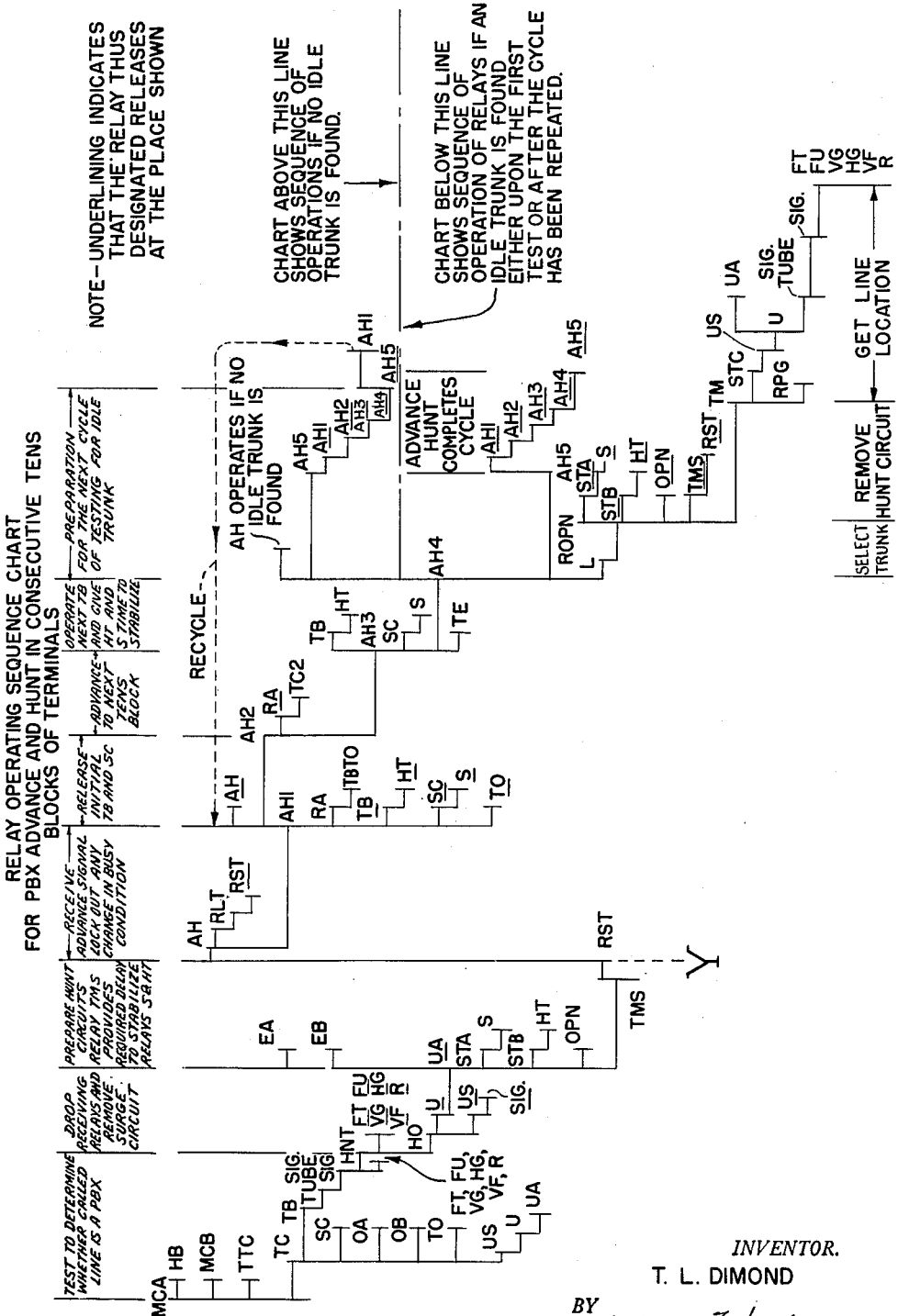

Oct. 14, 1952 — T. L. DIMOND — 2,614,176
ELECTRONIC INDUCTION NUMBER GROUP TRANSLATOR
Filed May 6, 1950 — 16 Sheets-Sheet 14

FIG. 15
RELAY OPERATING SEQUENCE CHART FOR PBX JUMP HUNT

NOTE — UNDERLINING INDICATES THAT THE RELAY THUS DESIGNATED RELEASES AT THE POINT SHOWN

INVENTOR.
T. L. DIMOND
BY William F. Simpson
ATTORNEY.

Oct. 14, 1952  T. L. DIMOND  2,614,176
ELECTRONIC INDUCTION NUMBER GROUP TRANSLATOR
Filed May 6, 1950  16 Sheets-Sheet 15

5 CROSS BAR SYSTEM FOR SETTING UP CONNECTIONS FOR AN INTRA-OFFICE CALL

*INVENTOR.*
T. L. DIMOND
BY William F. Simpson
ATTORNEY.

Patented Oct. 14, 1952

2,614,176

UNITED STATES PATENT OFFICE 2,614,176

ELECTRONIC INDUCTION NUMBER GROUP TRANSLATOR

Thomas L. Dimond, Rutherford, N. J., assignor to Bell Telephone Laboratories, Incorporated, New York, N. Y., a corporation of New York Application May 6, 1950, Serial No. 160,497

36 Claims. (Cl. 179—18)

This invention relates to automatic telephone switching systems of the type often referred to as common control systems, and particularly to means in such systems by which the telephone directory number of a called subscriber may, in effect, be translated into terms that will enable the marker circuit of such system to determine the location of the hold magnet of the called line in that system so that the connection of the calling line to the called line may be readily effected.

In many common control systems of the prior art the directory number of the line determines the location of that line upon the switching frames. In such an arrangement it is impossible to uniformly load the switching equipment without continually changing the directory number and changing the directory number is undesirable from the subscriber's standpoint as well as from the necessary changes in the directory, etc. In a cross-bar system, however, the location of any subscriber's line on the switching frame has been rendered independent of the directory number by a translating circuit commonly called a "number group circuit" which is provided for translating the directory number of a subscriber's line into the indicia representing the location of the line on the switching frames.

In a common control telephone switching system, particularly of the cross-bar type, each subscriber's line has associated with itself a line relay and the hold magnet of a cross-bar switch, which equipment is located on frames in the central office. The line equipment is usually considered as including the line hold magnet. The location of a particular hold magnet and thus the location of the line may be defined by specifying the number of the line-link frame and the numbers of the vertical group and the horizontal group of switches and also the vertical file of hold magnets upon the frame in which the particular hold magnet appears.

The present invention resides in an improvement in the number group circuit of a crossbar telephone system which translates the telephone directory number of the called subscriber's line to an indication of the location of the hold magnet of that line upon a line-link frame of such system, the improvement consisting in the use of a "ring" type of translator and switching means by which the translator is made effective. In this type of translator there is a conductor or jumper for each directory number associated with the number group. There is also a group of relays whose function is to select any one of the jumpers in accordance with the directory number and to send a surge of current through it. There is also a plurality of groups of coils, each coil having associated with it a device, such as a gas-filled tube, to convert a low power current into a current suitable for operating a relay. Each coil consists of a closed magnetic core with an output winding thereon, the said winding being connected to one of the gas-filled tubes in such a manner that when a voltage of sufficient magnitude is generated in the winding the tube will be fired. The input windings of the coils consist of the jumpers mentioned above which are threaded through the closed cores. Each jumper is threaded through a combination of coils, which combination is identified with the location of the line equipment on the frames. When the surge of current occurs in a jumper, the output windings of the coils through which the jumper is threaded are energized and the corresponding tubes will be fired. The tubes in turn cause relays in the marker to operate, and the combination of relays thus operated indicates the location of line equipment on the frame. In addition, provision has been made for locating or hunting an idle line of a group of lines to a common destination such as lines to a private branch exchange, frequently called a P. B. X. In other words, means are built into the translator to indicate P. B. X lines and to permit the marker to hunt over all the idle lines of a P. B. X group and to obtain the location of an idle line after such a line has been found by the marker.

The main advantage of the "ring" translator is that only a single jumper needs to be changed when the relation between a directory number of a line or station and the line equipment changes. This reduces considerably the amount of work required in making the changes necessitated by the changing traffic conditions.

The copending application of Cahill, Carpenter and Dimond Serial No. 57,388, filed October 29, 1948, which issued as Patent 2,599,358 on June 3, 1952, discloses means utilizing an inductive translator for translating the indication of the position of the terminals of a calling line into the digits of the directory number of that line and for recording said directory number. The present invention, while also employing an inductive translating device differs from that disclosed in the said application of Cahill, Carpenter and Dimond in that the present invention is concerned with the determination of the location upon a line-link frame of the hold magnet of a called line and it effects such determination by translating the directory number of that line into terms that indicate the particular frame and the particular vertical group and horizontal group of cross-bar switches and also the particular vertical file of hold magnets in which the hold magnet of the called line appears, thereby enabling the marker circuit to set the switches to establish the connection between the calling line and the called line.

This invention will be clearly understood from the following description when read in connection with the attached drawing, of which Fig. 1 shows two jumper terminal strips, one of which is employed when the wanted line is a non-P. B. X trunk, and the other when the wanted line is a P. B. X trunk;

Figure 2:
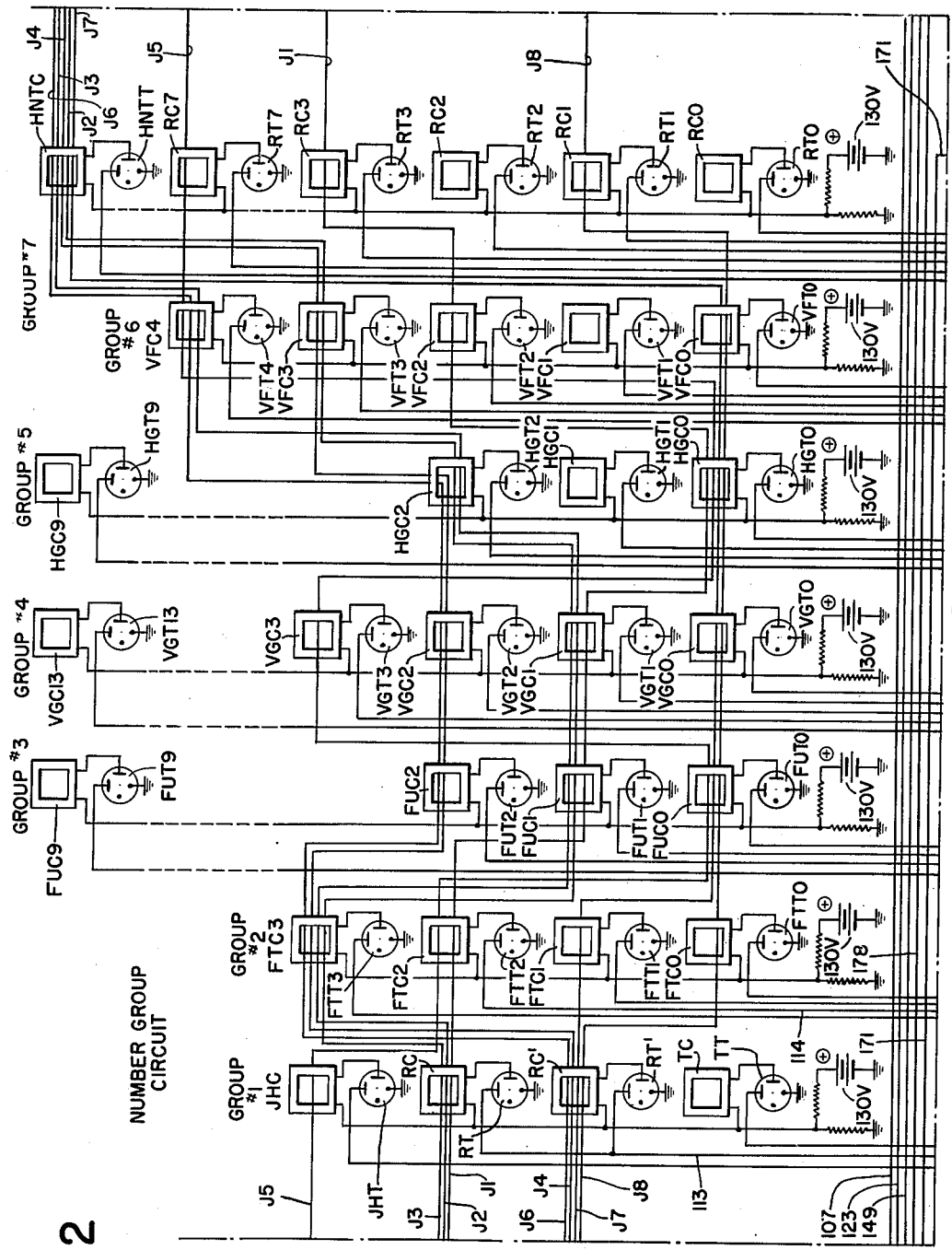
Fig. 2 shows the coils and tubes which are employed in translating each directory number into an indication of the position of the line equipment upon a given frame.
Figure 5:
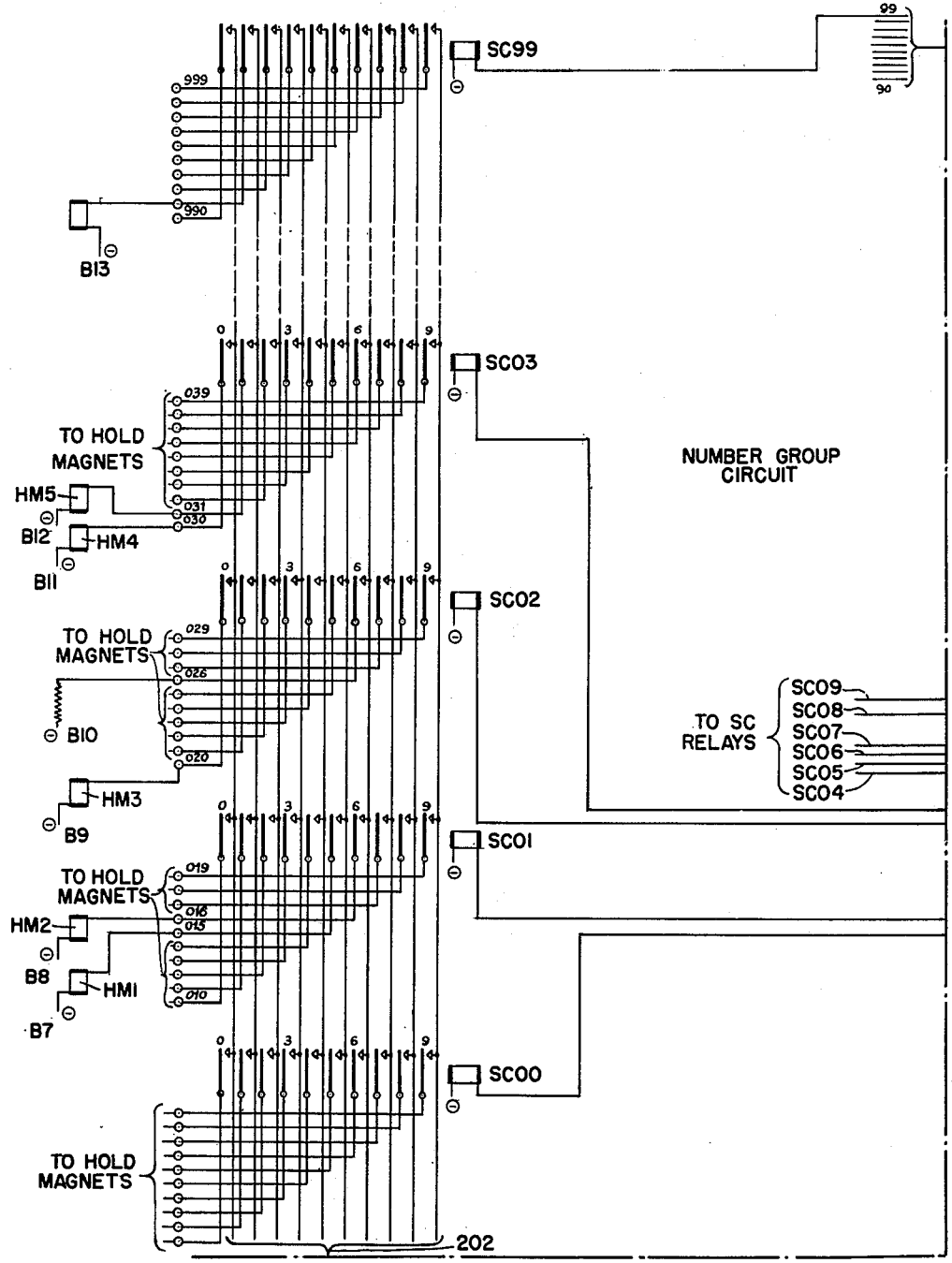
Figure 6:
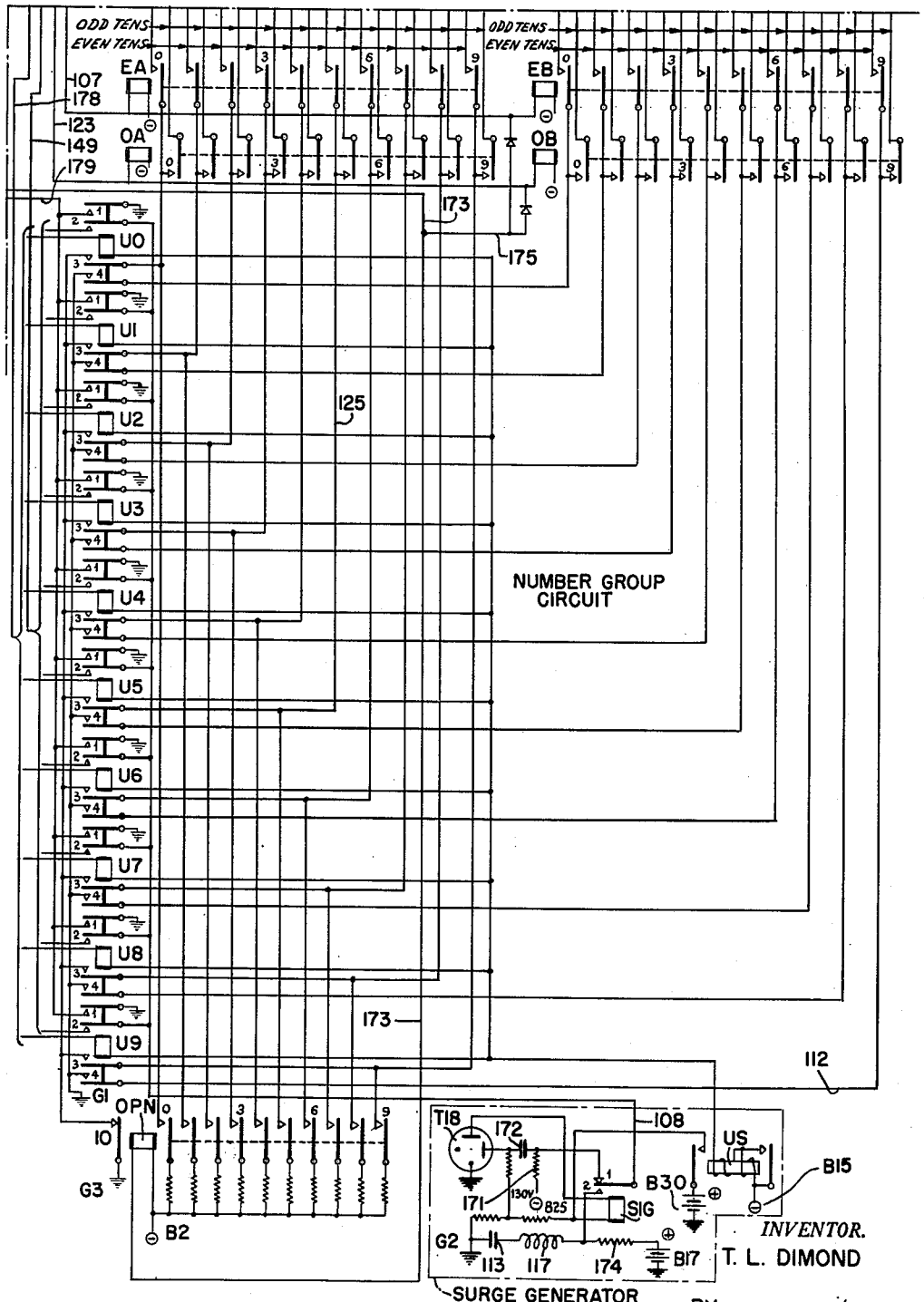
Figure 7:
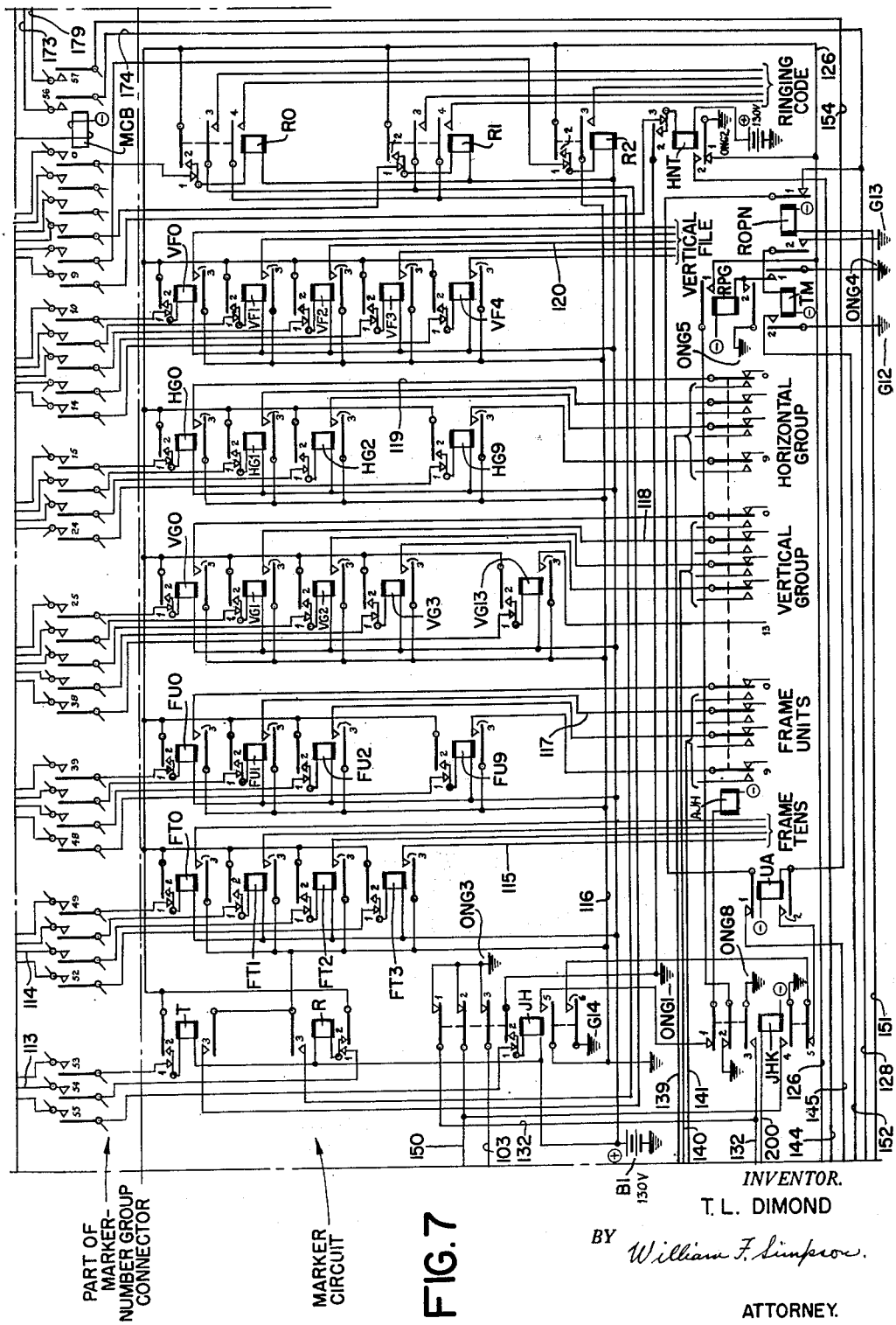
Figure 8:
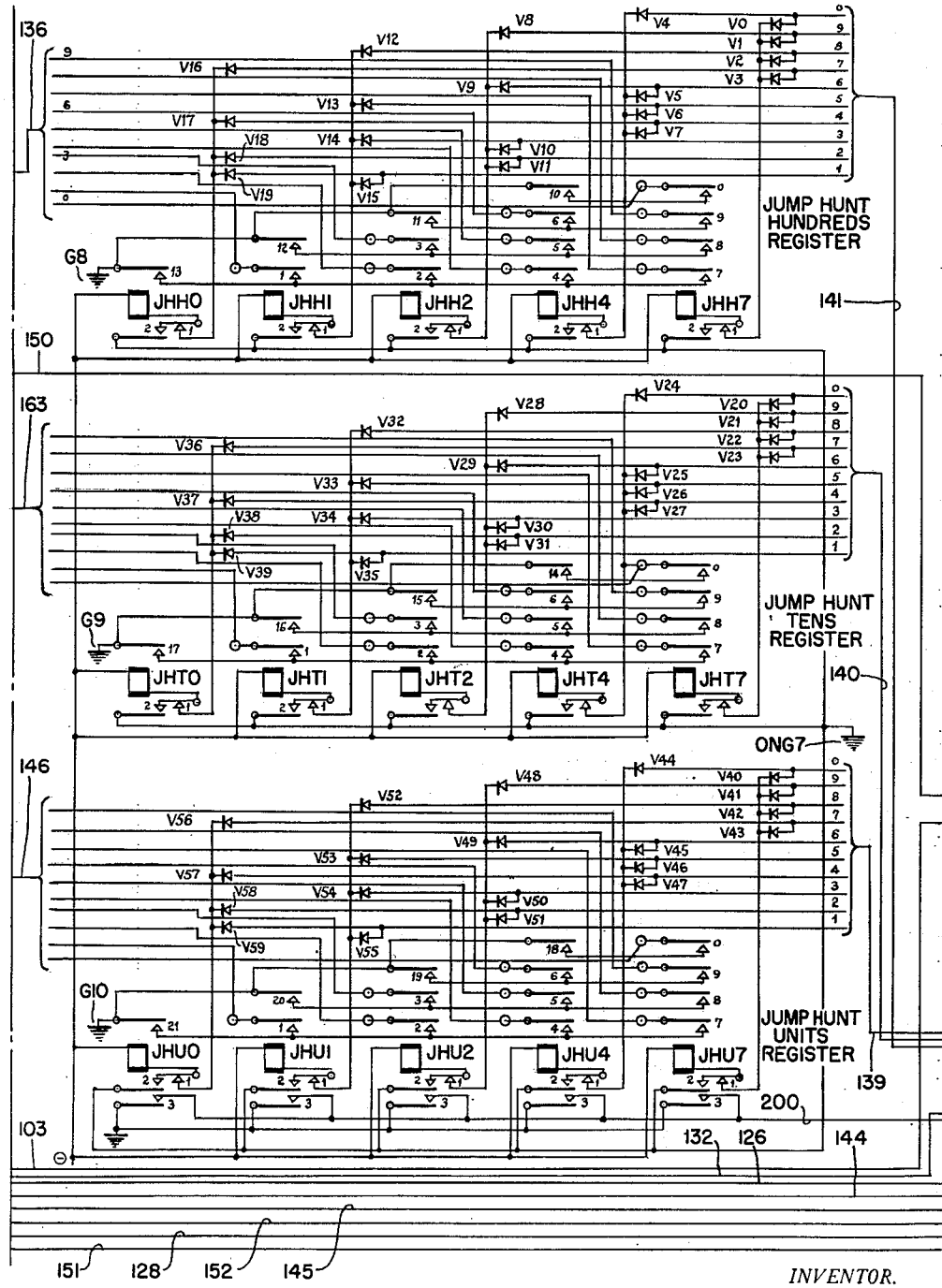
Figure 9:
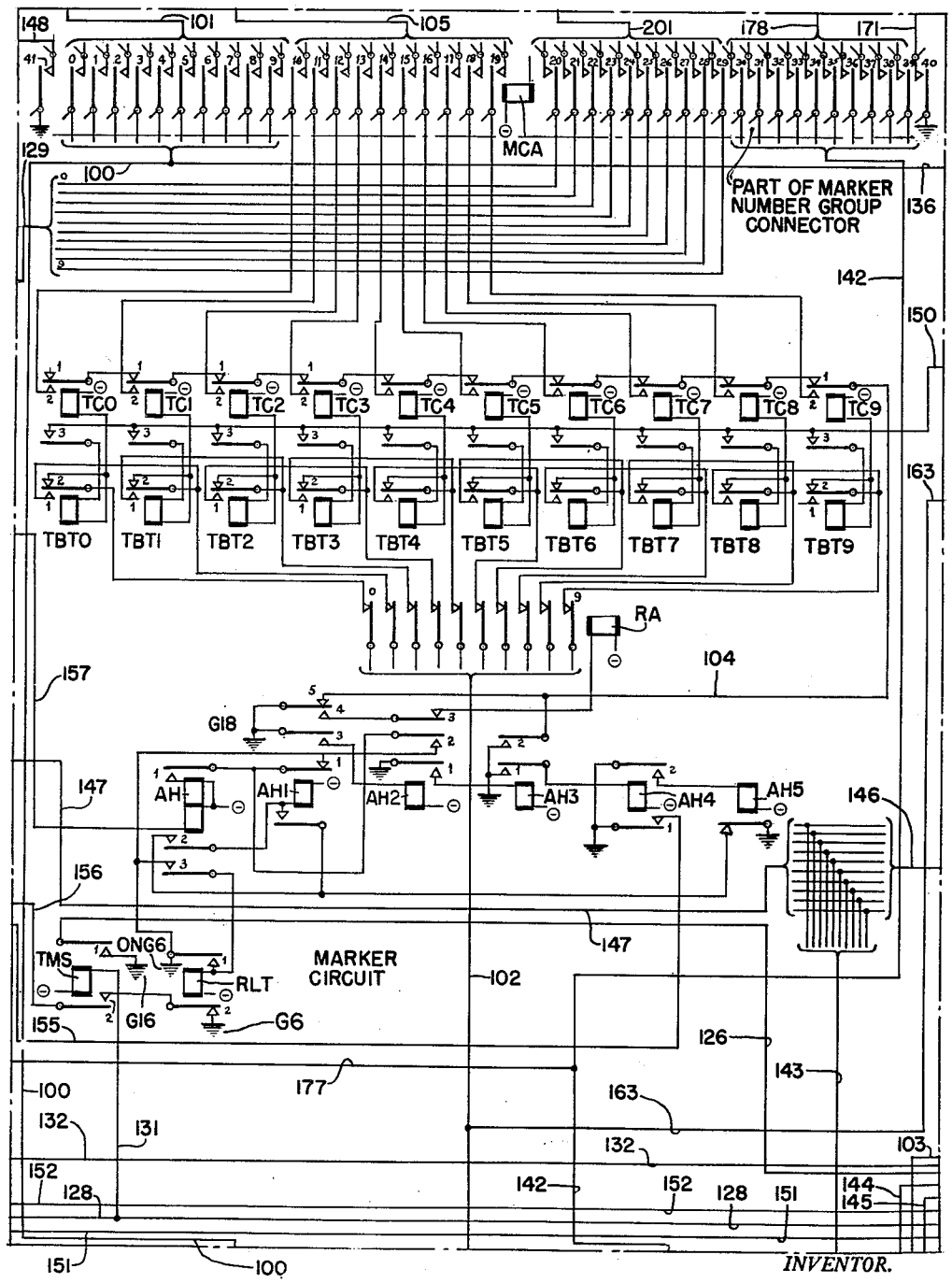
Figure 10:
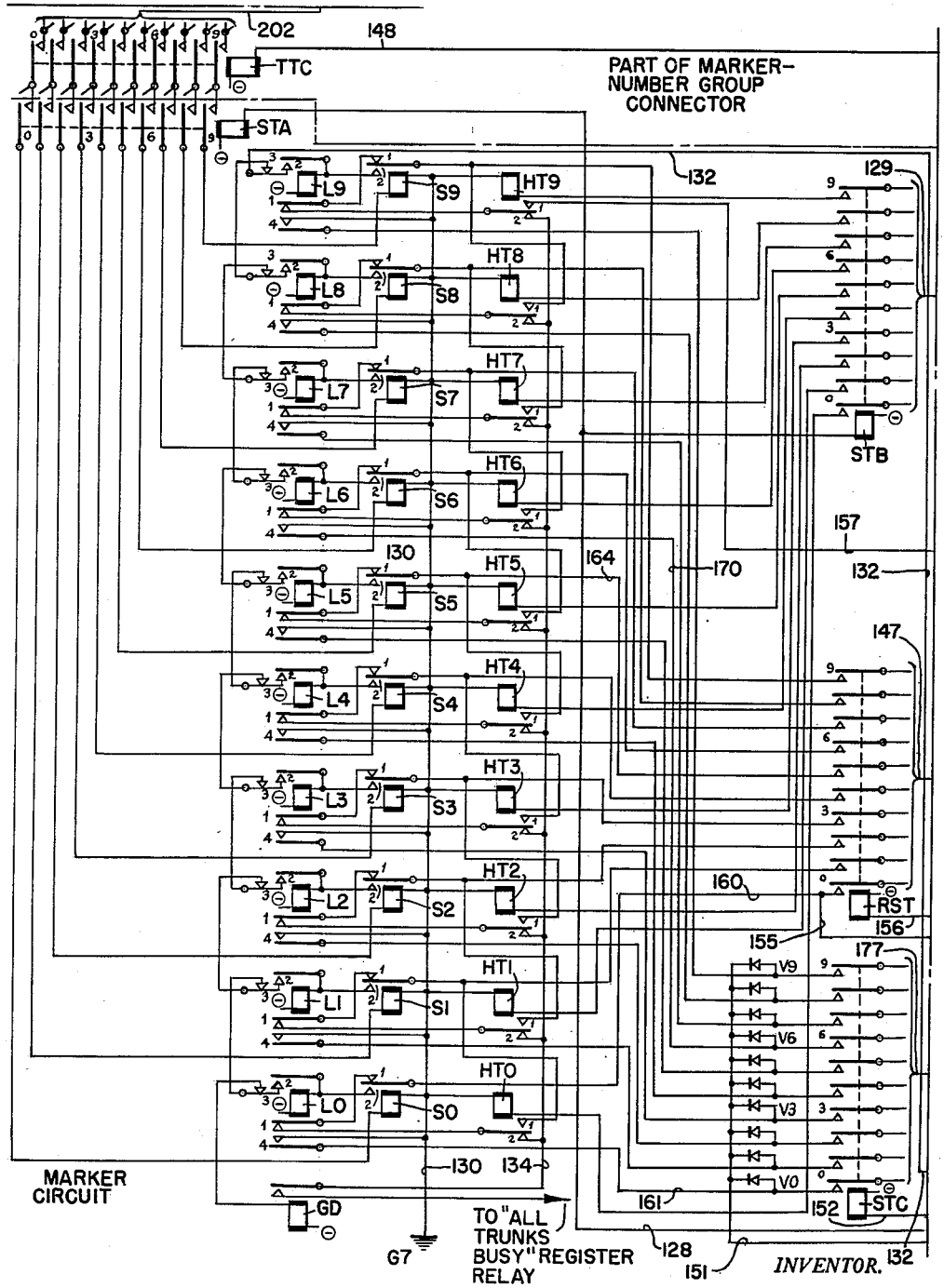
Figure 16:
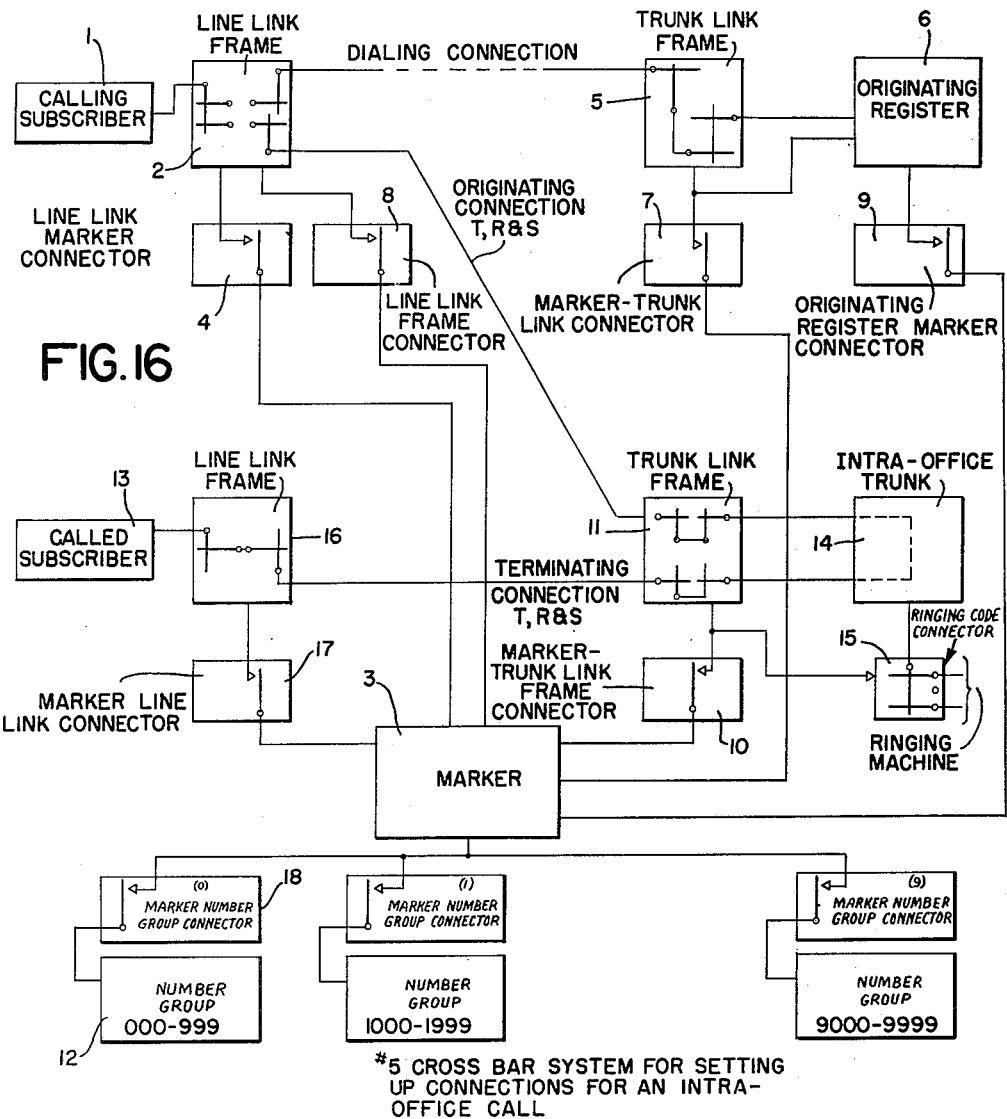
Figure 18:
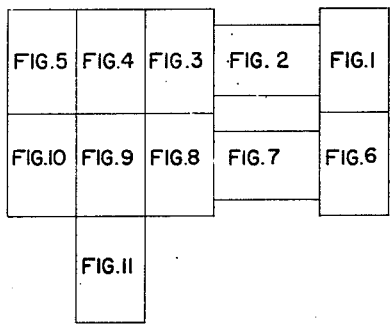
Figure 17:
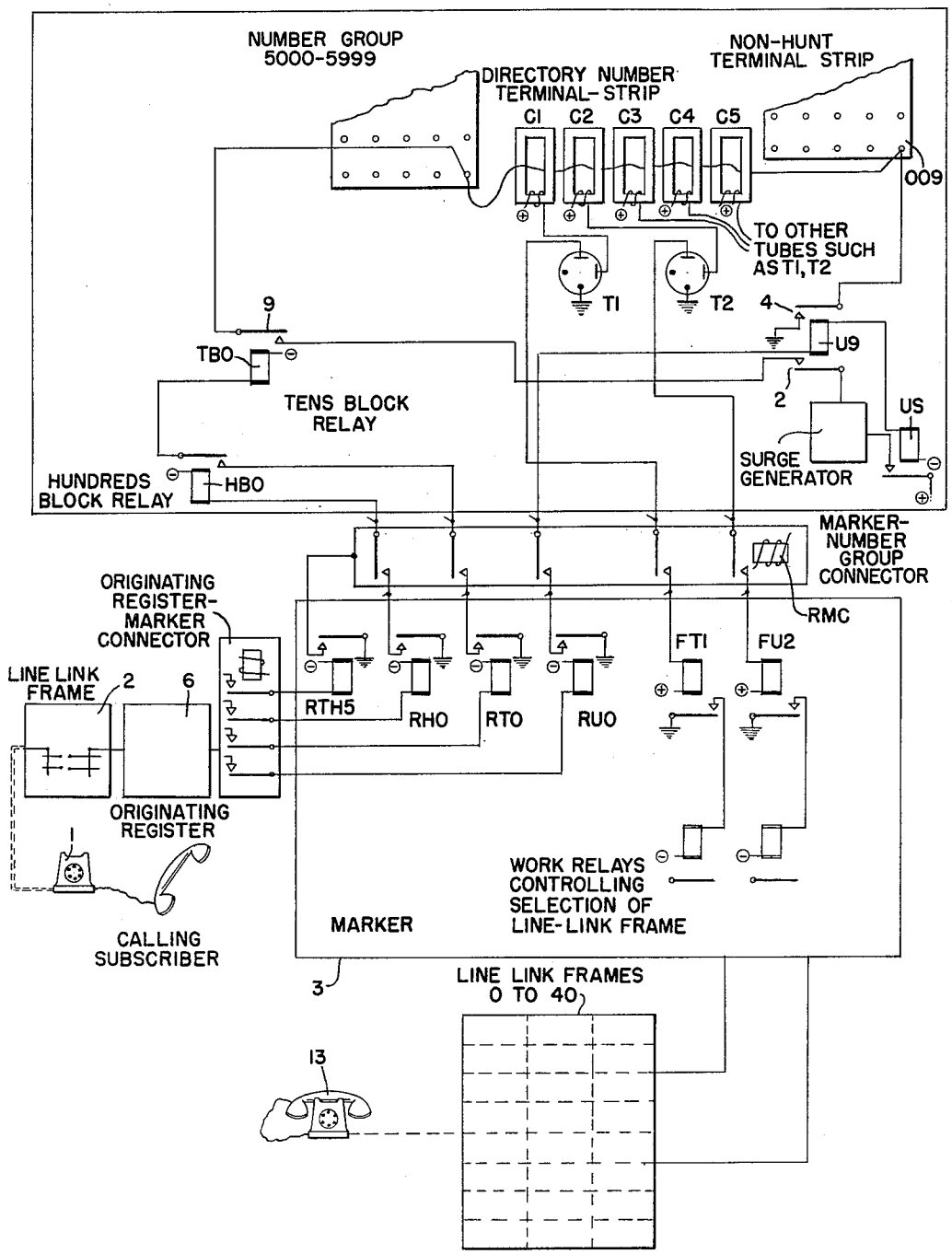

Fig. 5 shows sleeve connector relays used in selecting an idle P. B. X trunk;

Fig. 6 shows the unit relays, which, together with the aforesaid figures form part of the number group of the cross-bar system embodying the present invention;

Fig. 7 shows the register relays associated with and responsive to the action of the coils and tubes of Fig. 2;

Fig. 8 shows the register used in the translation of P. B. X directory numbers into block numbers where jump hunting is necessary;

Fig. 9 shows the marker number group connector relays;

Fig. 10 shows the sleeve test circuit for P. B. X trunk hunting;

Fig. 11 shows the relays of the dial code register in the marker, and also the relay of the register marker connector, Figs. 7 to 11, inclusive, constituting part of the marker of the cross-bar system;

Figs. 12 to 15, inclusive, are charts that show the relative sequence of operation of the relays of the circuit shown in Figs. 1 to 11, inclusive, to perform the function of translation of the directory number of a called line into a position indication of the terminals of that line to facilitate the connection of the calling party's line to the called party's line;

Fig. 16 is a block diagram illustrating a crossbar system;

Fig. 17 is a simplified drawing of a circuit embodying the invention in which certain parts are shown in greater detail than in the preceding figure; and Fig. 18 shows the manner in which Figs. 1 to 11, inclusive, should be arranged in order to show in its entirety the circuit embodying this invention.

Throughout the specification in which the invention is described, the apparatus has been designated by a letter or a combination of letters that indicates or suggests the function of the apparatus to which such designation refers and in those instances where a plurality of similar pieces of apparatus are employed, as, for example, a train of relays, the letter or letters are followed by a numeral to designate the specific piece of apparatus of the group. In all instances the designating symbol is followed by a numeral in parentheses that indicates the figure of the drawing upon which the apparatus appears.

The cross-bar system of automatic telephony with which the present invention may be employed is shown upon the block diagram, Fig. 16, and will be briefly described in order that the invention will be more readily understood. When the subscriber 1 originates a call in a crossbar system, such as that represented by Fig. 16, the line-link frame 2 engages an idle marker 3 by means of the line-link marker connector 4, and identifies itself to the marker and informs the marker that a dialing connection is to be established. Thereafter the marker proceeds to select a trunk-link frame such as 5 having an idle register connected therewith. The marker then selects an idle register such as 6 and obtains access to it through the trunk-link frame connector. Thereafter the marker connects to the line-link frame 2 through the line-link frame connector 8 and completes the identification of the calling line, a part of which, as mentioned above, was obtained through the line-link marker connector 4. This identification or calling line location information is furnished to the register where it is stored. When the idle register 6 has been seized by the marker 3, the marker selects one of ten channels that may be used to connect the calling subscriber with the register and operates the select and hold magnets of the switches to complete the channel. The marker 3 then releases its connections and upon the receipt of the dial tone from the register the subscriber 1 then dials the number of the wanted line into the originating register.

As soon as the registration has been completed, the originating register 6 seizes an idle marker (which may be No. 3 or another marker) through the originating register marker connector 9 and transmits to the marker, assumed to be No. 3, the calling line location, that is, its position upon a given line-link frame, viz., 2, and is, its position with respect to the vertical group, the horizontal group, and the vertical file of the switches upon such frame. The register 6 also transmits to the marker 3 the directory number of the called party. From the office code the marker determines whether an intra-office call is desired or an outgoing connection. Assuming that an intra-office connection is indicated, the marker tests for and seizes by means of the trunk-link connector 10 a trunk-link frame having an idle intra-office trunk, such as trunk-link frame 11, and thereafter the marker connects to a number group, such as 12, the purpose of which is to translate the directory number into information as to the particular line-link frame, such as 16, and the particular horizontal group, vertical group, and vertical file within that frame upon which the called subscriber's line 13 terminates. The number group 12 also determines whether the called line is a party line, or a P. B. X trunk and transmits to the marker such information and also information as to the type of ringing current to be applied, and how it is to be applied. The marker 3 then sets up a connection between intra-office trunk 14 and the called line 13 and sets the switch by which the appropriate ringing current from the ringing code connector 15 will be applied to the line. The marker then releases its connection to the line-link frame 16 of the called subscriber and then proceeds to select the line-link frame 2 of the calling line, releasing the connection between the calling line and the register. Thereafter the marker sets up the originating channel from the calling line 1 to the intra-office trunk 14 and then releases the register 6, line-link frame 2 and trunk-link frame 11 thus leaving the ringing and the supervision of the connection under the control of the trunk 14.

In the system heretofore employed there were three terminals per directory number in the number group, to each of which terminals a jumper was connected; hence, whenever a subscriber's number was removed or added, three jumpers had to be changed.

The present invention greatly simplifies this procedure in that the translation of the directory number of a called line into information as to the location of the frame with which that line is associated and the position of the terminals of that line upon that frame is effected by the use of a single jumper.

The basic principle of this invention will be clear from the following description of the system shown on Fig. 17 which shows the arrangement of the circuit when the called number is that of a non-P. B. X line.

When the calling subscriber 1 has been connected to the originating register 6 through the line-link frame 2 in the manner previously described, the directory number of the wanted subscriber will be set up in the originating register 6 by the operation of the dial at the calling subscriber's telephone. The setting up of the called party's number in the originating register puts a ground upon certain leads extending from that register to the originating register marker connector 9 through which the originating register is connected to the marker circuit 3. The relay in the register marker connector 9, when operated, will effect the connection of a large number of leads from the originating register to relays in the marker circuit. Ten of those leads will extend to the windings of ten relays of the thousands group such as RTH5(17) and ten leads will extend to ten relays of the hundreds group such as RH0(17). Likewise, ten leads will extend to ten relays of the tens group such as that designated RT0(17), and, likewise, ten leads will extend to ten relays of the units group of relays such as that designated RU9(17). For the sake of simplifying the description only one lead of each group is shown.

Since lead No. 5 of the thousands group, lead 0 of the hundreds group, and also of the tens group, and lead 9 of the units group, are grounded in the originating register, relays RTH5(17), RH0(17), RT0(17) and RU9(17) in the marker will be operated, the designating numerals of which correspond to the digits of the directory number of the called party, viz., 5009, and the marker will seize the number group circuit which is designed to translate the group of numbers 5000 to 5999. The manner in which the marker circuit seizes the number group circuit containing the desired thousands group of numbers is clearly described in the copending application of A. J. Busch, Serial No. 57,394 filed October 29, 1948, now Patent No. 2,585,904, and it is felt that it need not be described herein.

Since the marker has established contact with the number group through the operated marker number group connector relay RMC(17), the relays RH0(17), RT0(17) and RU9(17) will thereupon effect the operation of relays in the number group circuit by which the translation of the directory number into an indication of the position of the terminals of the wanted line upon a particular line-link frame and their specific location upon a cross-bar switch upon that frame may be determined. The operation of relay RH0(17) grounds the winding of the hundreds block relay HB0(17) in the number group circuit and effects the closing of ten contacts, of which, for the sake of simplicity, only one is shown. The closing of contact 0 of relay HB0(17) grounds the winding of the tens block relay TB0(17) which closes ten contacts, of which only one is shown. The armature 9 of relay TB0(17) is connected to one of the terminals, viz., 009, upon the directory number terminal strip and the contact point of that relay connected to contact 2 of the unit relay U9. As will be seen hereinafter in the detailed description of the circuit shown in Figs. 1 to 11, inclusive, there is one relay, such as U9(17), for each unit digit 0 to 9 to which the other contact points (not shown) of relay TB0(17) would be similarly connected, but for the sake of simplicity only one such relay is shown on Fig. 17.

The winding of relay U9(17) is connected in the circuit that extends from the armature of the register relay RU9(17) to the battery associated with relay US(17), and upon the operation of the relay RU9(17), relays U9(17) and US(17) will be operated. Relay US(17) controls the connection of a source of potential to the surge generator which is connected to the lower armature of relay U9(17). The upper armature of that relay is connected to terminal 009 of a terminal strip, designated the non-hunting terminal strip, which is employed when the wanted subscriber's line is a non-P. B. X trunk. Between the terminal 009 of the directory number terminal strip and terminal 009 of the non-hunting terminal strip extends a cross-connecting wire or jumper which is threaded through a plurality of coils by which the translation of the directory number to an indication of the position of the terminals of the wanted line in the cross-bar system is effected. Each of those coils is connected to a circuit containing an electronic device, such as a gaseous discharge tube, and a relay, and each of such circuits performs a step in the process of indicating the particular line-link frame, and the position thereon of the desired cross-bar switch, and also the position on that switch of the terminal of the wanted subscriber's line. The manner in which those circuits function to effect such translation is as follows:

Since relay RU9(17) has been operated, relay U9(17) will thereby be operated and a circuit will be established that may be traced from the surge generator through contact 2 of relay U9(17), contact of relay TB0(17), terminal 009 of the directory number terminal strip, the jumper threaded through a plurality of coils to terminal 009 of the non-hunting terminal strip to ground through contact 4 of relay U9(17). Thereupon a surge of current will flow from the generator to the circuit just traced and will set up a voltage in the translator coils through which the jumper is threaded. The voltage set up in coils C1 and C2 will cause the firing of the cold cathode tubes T1 and T2 associated with those coils. When tube T1 becomes conductive, frame tens relay FT1(17) in the marker circuit will operate; likewise, the firing of the tube T2 will effect the operation of the frame units relay FU2(17) in the marker. The operation of the frame tens relay FT1(17) signifies that the location of the cross-bar switch upon which the wanted line terminates is in the group of frames 10 to 19 and the operation of relay FU2(17) specifically identifies that frame as No. 12. Those relays will accordingly operate work relays in the marker which will establish a connection to the line-link frame 12, the manner of doing which is fully described in the copending application of Busch heretofore referred to.

By means of the other coils shown in Fig. 17, through which the jumper passes, and their respective circuits (not shown but similar to those connected to coils C1 and C2), the position of the hold magnet of the called line upon a cross-bar switch in terms of vertical group, horizontal group and vertical file, would be indicated by the operation of relays similar to FT1(17) and FU2(17). By employing additional coils further information may be given to the marker circuit to enable it to perform desired acts upon the subscriber's line thus located. Such additional coils are shown in connection with the circuit shown by Figs. 1 to 11, inclusive, and the functions that they perform are fully explained in the description of that circuit. By selecting the proper combination of coils in each of said groups through which the jumper is threaded, the marker is enabled to identify the called line and connect to its terminals upon the line-link frame.

As soon as the location of the terminals of the wanted line has been determined, the number group circuit is released so that it may be used by another marker to locate the terminals of another wanted line. Thereupon the marker 3, shown in Fig. 17, will test the wanted subscriber's line 13 to determine whether it is busy or idle, and if that test shows the line to be idle, the marker will proceed to establish a connection between the line-link frame of the calling subscriber and the line-link frame of the called subscriber, the manner of doing which has been described hereinbefore.

Having in mind the foregoing description of the basic principle involved in the applicant's system for translating the directory number of wanted non-P. B. X telephone line into an indication of the position of the terminals of such line upon a line-link frame, the manner in which the circuit shown in Figs. 1 to 11, inclusive, operates in order to effect such translation for non-P. B. X lines and also P. B. X lines is as follows:

*Method of translating the directory number of a called non-P. B. X line to an indication of the position of its terminals upon a line-link frame*

(Relay Operating Sequence Chart Fig. 12)

Assuming that the directory number of the called party has been set up in the originating register and that the originating register marker connector RMC(11) has been operated, the register will be connected to a marker through a plurality of contacts of the connector and by a plurality of leads extending therefrom to the marker, ten of which leads represent the thousand groups, ten leads represent the hundreds group, ten leads represent the tens group, and ten leads represent the units group. One lead in each group will be grounded in the originating register, the grounded leads representing the last four digits of the directory number of the called party. As previously pointed out, the marker, upon receiving a call from the originating register that indicates that the call is an intra-office call, establishes a connection to a number group circuit in order that the directory number may be translated into an indication of the position on the line-link frame upon which the called party's line terminates. Each number group circuit is equipped to assist in the translation of one thousand directory numbers; therefore there will be one number group circuit assigned to each series of 1000 directory numbers, and the marker, by examining the thousands digit of the called directory number, will determine which number group circuit contains the directory number of the called party, and will establish a connection thereto.

In order to simplify the description of the present invention, the mode of selection of the particular number group containing the thousands digits of the directory number has been omitted, but it is to be understood such selection will be made in the manner shown in the copending application of A. J. Busch mentioned hereinbefore.

When the marker seizes a number group circuit the marker connecting relay MCA(9) will be operated by a preference relay in the marker preference circuit the function of which is to prevent the seizing of a number group circuit while it is being used by another marker. The marker preference circuit, which forms no part of the present invention, is fully described in the copending application of Busch hereinbefore mentioned.

The operation of relay MCA(9) effects the operation of relays MCB(7) and TTC(10), the function of which relays will presently appear. The marker will thereupon proceed to effect the operation of the number group circuit by which the directory number will be, in effect, translated into an indication of the position in the line-link frame of the hold magnet of the line of the called party.

Assuming that the last three digits of the directory number are represented by the number 009 and that the register marker connecting relay RMC(11) has operated, the zero lead of the hundreds group, the zero lead of the tens groups and No. 9 lead of the units group of RMC(11) will be grounded, and in consequence the zero relay RR0(11) of the hundreds group relays, the zero relay RT0(11) of the tens group relays, and relay RU9(11) of the units group relays will be operated. Relays RH0(11), RT0(11) and RU9(11) will lock through a circuit that includes battery, the windings of those relays, lead 103, contact 3 of relay JH(7), and the off-normal ground ONG3(7). The operation of relay RH0(11) grounds the zero conductor of the cable 100, and thereby effects the operation of the hundreds block relay HB0(4) by closing the circuit that extends from ground upon the armature of RH0(11) and includes the zero lead in cable 100, the contact 0 of relay MCA(9), lead 0 of cable 101, the winding of the hundreds block relay HB0(4) and battery. Upon the operation of relay HB0(4) a plurality of contacts 0 to 9 will be closed and will serve to connect the leads 0 to 9 of the tens group to the tens block relays TB00-01(4) to TB08-09(4), the purpose of which will presently appear.

The operation of relay RT0(11) grounds the lead 0 of the cable 102 and effects the operation of relay TC0(9) by closing a circuit that extends through contact 0 of relay RA(9), contact 2 of relay TBT0(9), the winding of relay TC0(9) to battery. Thereupon a circuit will be closed from ground G18 and contact 5 of relay AH1(9) which includes conductor 104, the chain of contacts 1 of the group of TC relays, contact 2 of operated relay TC0(9), contact 10 of relay MCA, conductor 0 of cable 105, contact 0 of relay HB0(4), the TB00 winding of relay TB00-01(4) and battery, thereby causing the operation of the latter relay. It will be noted that branches extend from the even-numbered tens leads, 0, 2, 4, etc., of cable 105 to relay TE(4) and also from the odd-numbered tens leads, 1, 3, 5, etc., to the tens odd relay TO(4), each of said branches including a unilateral conducting device such as the varistors V0, V1, V2, etc., shown on Fig. 4. Connected in parallel with relay TE(4) by conductor 107 are the relays EA(6) and EB(6). Likewise connected in parallel with relay TO(4) are the relays OA(6) and OB(6). Since the tens digit of the directory number being sought is 0, which is considered an even number, relays TE(4), EA(6), and EB(6) will accordingly be operated. The operation of relay TE(4) closes its contacts 0 to 9, inclusive, the purpose of which will presently be stated.

Upon the operation of the marker connecting relay MCA(9), as previously mentioned, a circuit was closed from the grounded contact of relay RU9(11) which extends through contact 9 of relay H0(11), lead 9 of the cable 142, contact 39 of relay MCA(9), cable 178, the winding of the unit relay U9(6), the winding of relay US(6) and battery, thereby operating relay US(6), which by the shorting of one of its windings, allows relay U9(6) to operate. The closing of the contact 1 of relay U9(6) grounds conductor 179 and causes the operation of relay UA(7) through contact 57 of relay MCB(7) and lead 154. Relay UA(7) closes its lower contact and opens its upper contact, the purpose of which will later appear. The closing of contact 2 of relay U9(6) establishes a circuit extending from the armature of relay SIG(6) over lead 108, contact 2 of relay U9(6), the lead 9 of cable 149 to contact 9 of relay TE(4), thence the circuit will be extended to the contact 9 of the tens block relay TB00-01(4) which also has been or will be operated. The units conductor 9 will thereby be connected through cable 109 to terminal 009 on the directory number terminal strip 111 having thereon one thousand terminals. Terminal 009 is connected by the jumper J1 to the same number terminal on the regular (non-hunting) terminal strip 110 shown on Fig. 1. The jumper J1 in extending from the directory number strip 111 to the regular terminal strip 110, is threaded through a plurality of coils each having a large number of turns, said coils being arranged in groups as shown in Fig. 2. Certain of those coils furnish information as to the location of the terminals of the called line and the type of ringing current to be applied, and other coils control the operation of the circuit when hunting an idle P. B. X trunk.

The coil JHC of the group No. 1 controls the functioning of the selecting circuit when the wanted line is one of a group of P. B. X trunks that requires jump hunting. The coils RC, RC′ and TC of group No. 1 are employed to control the application of the ringing current to the ring side or tip side of the line when the called line is a party line. The use of two coils, viz., RC and RC′, instead of a single ring coil is necessitated by the number of jumpers to be threaded through the ring coil which sometimes is greater than the capacity of a single coil. The coils RC and RC′ function, in effect, like a single coil (and could be replaced by a single coil) since the tubes controlled by those coils are connected in parallel to the ring relay R of the marker. The coils of groups No. 2 and No. 3 assist in the determination of the number of the line-link frame upon which the called party's line terminates, the coils of group No. 2 giving the tens digits and those of group No. 3 giving the units digits of the number of the said frame. The coils of groups No. 4, No. 5 and No. 6 indicate the vertical group, the horizontal group and the vertical file, respectively, of the line-link frame upon which the terminals of the desired line are located. The coils RC0 to RC7 of group No. 7 give information as to the type of ringing current to be applied to the called line, and coil HNTC serves to control the translating circuit when the desired line is a P. B. X trunk that requires hunting, the manner of doing which will later be fully described. The number of coils required in each group may, in some cases, be varied. The frame tens and frame units group need only enough coils to indicate the actual number of frames in an office. The vertical group of coils may require considerably fewer than fourteen (the number indicated in Fig. 2) if the traffic per line is heavy so that there are fewer than fourteen vertical groups per line-link frame. There are always ten horizontal groups and five vertical files per frame. In group No. 7, the number of coils depends upon the type of service supplied in the office. If there is only four-party selective ringing then only two coils for ringing control and one for P. B. X hunting will be required.

Assuming that the called subscriber's line is a party line to which ringing current is to be applied over the ring conductor, the jumper J1 will be threaded through the coil RC of group No. 1 in order to effect the proper connection in the marker for the application of ringing current to the ring side of the line. The jumper will then be threaded through the proper combination of coils of succeeding groups No. 2 to No. 7, inclusive, and will be connected to terminal 009 of the non-hunting terminal strip 110.

The terminal 009 will be connected through contact 9 of relay EB(6) (which operated when the relay TE(4) operated), lead 112, contact 4 of relay U9(6) to ground G1(6). Thereupon a circuit will be closed that may be traced from battery B25 through resistance 171, the armature of relay SIG(6), over lead 108, through the contact 2 of relay U9(6), conductor 9 of cable 149, contacts 9 of relays TE(4) and TB00-01(4), cable 109, jumper J1 to terminal 009 upon the terminal strip 110, thence through the contact 9 of relay EB(6) to ground through contact 4 of relay U9(6). The sudden change in potential on the right plate of capacitor 172 due to the closure of ground to it will cause the gas-filled tube T18 to fire from the ground on its cathode to its control anode. It will then conduct in its main anode and will operate relay SIG(6). The latter thereupon transfers the jumper J1 from the resistance 171 to the surge generating circuit consisting of the capacitor 113, inductor 117 and resistance 174. The capacitor 113 is charged to the voltage of the positive battery B17 until relay SIG(6) operates. It then discharges through inductor 111 to ground on the jumper J1. The discharge current will be a gradually decaying oscillation. This oscillatory current in the jumper will cause it to operate as a primary winding of one turn thus inducing a voltage in the winding of each of the coils RC, FTC2, FUC1, VGC1, HGC0, VFC2 and RC3 through which the jumper J1 passes which will cause the tubes RT, FTT2, FUT1, VGT1, HGT0, VFT2 and RT3, associated with said coils, to fire from cathode to control anode, then to operate in their main anode circuits relays in the marker (Fig. 7) which effect the translation of the directory number of the called subscriber's line to an indication of the position upon the line-link frame of the terminals of the called party's line having such directory number.

The firing of the tube RT, which is connected to the winding of coil RC of the ringing and control group, will close the circuit extending from ground through that tube thence over conductor 113, contact 54 of the marker number group connector relay MCB(7) (which has been previously operated), the winding of relay R(7) to the battery B1 thereby operating relay R(7) which by opening contact 1 and closing contact 2 will lock to ground ONG2(7). Contact 3 of relay R(7) will also be closed and thereby control the application of the ringing current to the ring side of the line.

The voltage set up by the surge in the winding of the coil FTC2 of the frame tens group causes the tube FTT2 to fire and thereby operates the frame tens relay FT2(7) by closing a circuit that extends from ground upon the said tube and includes lead 114, contact 51 of relay MCB(7), contact 1 of relay FT2(7) and battery B1. Upon operating, relay FT2(7) locks upon the off-normal ground ONG2. Through contact 3 of relay FT2(7) a circuit is established which extends from battery through the winding of a work relay of the marker (not shown), conductor 115, contact 3 of relay FT2(7), conductor 116 to ground G6(7), which will operate the work relay of the marker, and, in the manner hereinafter described, will connect the marker to the line-link frame having the desired tens digit.

The operation of the tube FUT1, associated with coil FUC1 of the frame units group, effects the operation of the frame units relay FU1(7) causing the opening of its contact 1 and the closing of its contacts 2 and 3; the closing of contact 2 locks that relay upon ground ONG2 in the same manner in which the frame tens relay FT2(7) was locked, and the closing of contact 3 serves to connect a work relay of the marker (not shown), the circuit of which extends from battery through the winding of the work relay, conductor 117, contact 3 of relay FU1(7), to ground upon conductor 116. In similar manner the tube VGT1 will be fired and relay CG1(7) of the vertical group will be operated, opening its contact 1 and closing its contacts 2 and 3, thereby locking that relay upon ground ONG 2 and operating another work relay of the marker, the operating circuit for that work relay extending from battery through winding of the work relay and thence over conductor 118, contact 3 of relay VG1(7) and conductor 116 to ground. The firing of the tube HGT0 effects the operation of relay HG0(7) of the horizontal group and causes the opening of its contact 1 and the closing of its contacts 2 and 3, thereby locking that relay upon the ground ONG2 and closing the circuit through conductor 119 to cause the operation of another work relay of the marker. The firing of the tube VFT2 operates relay VF2(7) of the vertical file group, opening its contact 1 and closing its contacts 2 and 3. That relay will be locked through contact 2 and will close a circuit through lead 120 to operate another work relay of the marker. The firing of the tube RT3 will operate relay R3(7) which, by operating a circuit in the marker serves to give special information to the marker, as to the nature of the ringing current to be applied to the called line.

The registration of the called line location and the type of ringing required has now been set up in the marker by the operation of the proper relays in the marker and locked independently of the number group circuit. The number group is thereupon released and the marker then must seize the called line and test for a busy condition prior to connecting it to an intra-office trunk. In order to test the called line the marker must seize the line-link frame which, by the operation of the relays of the frame tens and the frame units groups, has been identified by the number group circuit and must thereafter locate the position of the terminals of the line with respect to the vertical group, the horizontal group and the vertical file representing that line. This is done by the operation of the work relays in the marker which respond to the operation of relays of the VG group, the HG group and the VF group. Using this information the marker will establish a connection to the cross-bar switch hold magnet upon which the wanted line terminates.

When the marker has established a connection with the called line upon the line-link frame, it will test the line to determine whether it is busy or idle. The manner of doing this is set forth in the copending application of Busch previously referred to and forms no part of the present invention. If the called line tests busy the marker will connect the calling line to a busy tone trunk to inform the calling subscriber that the line is busy. If, on the other hand, the called line is idle, the marker will proceed to connect the called line to one of the terminals of the intra-office trunk and at the same time to connect the calling line to that trunk, the manner of effecting these connections being also fully disclosed in the said Busch application.

As has been pointed out heretofore, the marker is locked through circuits that are independent of its connection to the number group. Accordingly, as soon as the register relays in the marker (Fig. 7) have been operated by the firing of the tubes in the number group and have locked, the number group will be released by the marker and will thereby become available for use by another marker that is seeking a number group containing the blocks of terminals in which would be found the thousands, hundreds, tens and units digits corresponding to the directory number of the wanted line.

*Method of hunting an idle P. B. X trunk in a group of trunks in the same tens block of terminals*

(Relay Operating Sequence Chart, Fig. 13)

When the called line is a P. B. X trunk, the mode of operation of the circuit in effecting the translation of a directory number into an indication of the location of the terminals of the trunk to guide the marker to the called line differs from that employed where the called line is a non-P. B. X line. Furthermore, the mode of operation of the translator, when seeking an idle P. B. X trunk will vary depending upon whether all trunks extending to the called P. B. X have directory numbers in the same tens block of terminals at the central office or whether they are divided between two consecutive tens blocks, or, in the third case, whether they are divided into groups which are located in non-consecutive tens blocks.

When all trunks extending to a given P. B. X have directory numbers in the same tens block the mode of operation of the circuit in finding a non-busy trunk and of translating the directory number of that trunk into the correct position designation of the terminals of that trunk upon a line-link frame is as follows:

In accordance with the customary practice of assigning a master directory number to a group of P. B. X trunks of a particular subscriber, which is usually the first number of the group, that number will be set up in the originating register 6 of the crossbar system, shown in Fig. 16, by actuation of the dial at the calling subscriber's station in the same manner in which a number was set up in the case of a non-P. B. X call, described heretofore. The originating register will then seize the marker 3 through the register marker connector 9 and will set up in the marker the directory number of the trunk of the called P. B. X by operating a relay in the thousands group, the hundreds group, the tens group and the units group corresponding to the digits of the directory number of the trunk. The marker will then be connected to that number group which is designed to translate the block of one thousand numbers in which the called number would be found. Thereupon one register relay in each of the RH(11), RT(11) and RU(11) groups of relays will be operated, the particular relay depending upon the particular digit in the hundreds, tens and units groups appearing in the directory number of the P. B. X trunk upon which the search for an idle trunk will begin. Assuming that the last three digits of the directory number of the first trunk of the wanted group of P. B. X trunks are 015 (and that there are three more trunks in succession in the group whose last three digits are 016, 017 and 018), the register relays RH0(11), RT1(11) and RU5(11) corresponding to the number of the first trunk of the group will be operated and will lock through a circuit that will include battery, the windings of the said register relays, conductor 103, contact 3 of relay JH(7) and the off-normal ground ONG3(7).

After the marker has seized the desired number group through the marker number group connector, the marker connecting relay MCA(9) will be operated by one of the preference relays as explained hereinbefore in describing the method of locating the terminals of a non-P. B. X subscriber's line. Through the closed contacts 0 to 9 of relay MCA(9) the hundreds leads are extended to the hundreds block relays and through its contacts 10 to 19 the tens leads are extended to the tens block relays shown on Fig. 4. Through contacts 20 to 29 of relay MCA(9), the units leads are extended to the sleeve test circuit, shown on Fig. 10, for P. B. X trunk hunting, which procedure will be presently explained. The closing of contacts 30 to 39 of relay MCA(9) extends the leads from relays RU0 to RU9, Fig. 11, to the windings of the units relays U0 to U9, Fig. 6, the purpose of which will presently appear. The closing of contact 40 grounds the lead 171 which is connected to the winding of relay MCB(7), thereby effecting the operation of that relay. The closing of contact 41 of relay MCA(9) effects the operation of the number group connecting relay TTC(10), the purpose of which will be apparent from the description of the circuit of which relay TTC(10) forms a part.

The operation of the hundreds register relay RH0(11) in the marker closes a circuit that extends from ground and includes contact 1 of that relay, lead 0 of cable 100, contact 0 of relay MCA(9), the lead 0 to the winding of the hundreds block relay HB0(4) thus operating relay HB0(4) and the closing of its contacts 0 to 9. The operation of the tens register relay RT1(11) of the marker causes the operation of the corresponding tens connector relay TC1(9) which in turn operates the tens block relay TB00-01(4) on its TB01 winding, the operating circuit extending from battery through the said TB01 winding, contact 1 of the hundreds block relay HB0(4), contact 11 of the marker connector relay MCA(9), contact 2 of the tens connector relay TC1(9), thence over the chain of contacts 1 of relays TC2(9) to TC9(9), conductor 104 to the ground G18 upon the contact 5 of relay AH1(9). The operation of relay TC1(9) (which is one of the odd-numbered relays responding to an odd-numbered tens digit) operates the odd relays TO(4), OA(6), and OB(6), the operating circuit extending from ground G18 on the armature of relay AH1(9) and including contact 5 of that relay, conductor 104, the chain of contacts 1 of relays TC9(9) to TC2(9), contact 2 of relay TC1(9), contact 11 of relay MCA(9), lead 1 to the branch including varistor V1(4), lead 123, varistor V11(4), windings of relays OA(6) and OB(6) and battery. Relay TO(4) operates in this same circuit. The units register relay RU5(11) grounds the lead 5 of the cable 142, and thereby closes a circuit which effects the operation of relay US(6) which short circuits its own high resistance winding and thereby allows relay U5(6) to operate, the operating circuit of which extends from ground on the armature of relay RU5(11) and includes contact 1 thereof, contact 5 of relay H0(11), lead 5 of cable 142, contact 35 of the marker connector relay MCA(9), cable 178, the windings of relays U5(6) and US(6) and battery B15.

The operation of the unit relay U5(6) closes a circuit that extends from the armature of relay SIG(6) and includes lead 108, contact 2 of relay U5(6), lead 5 in cable 149, the units lead 5 extending to contact 15 of relay TO(4) (which is now operated), contact 15 of the tens block relay TB00-01(4), lead 015 in cable 133 and terminal 015 upon the directory number terminal strip. Thence the circuit will be extended by the jumper J2 which is threaded through the coil RC of group 1 to indicate that ringing should be applied to the ring side of the line, then through the coils FTC3, FUC1, VGC1, HGC2, VFC3, and the hunt coil HNTC, and since the wanted line is a P. B. X trunk, will terminate on the terminal 015 of the hunt terminal strip 158, which terminal is connected through the closed contact 5 of relay OA(6), lead 125, contact 3 of relay U5(6), contact 10 of relay OPN(6) to ground G3. Since each armature of each tens block relay, such as TB00-01, TB02-03, etc., is connected to a terminal of the directory number terminal strip 111 shown on Fig. 3, one of those terminals, depending upon which tens block relay and which units relay may be operated, will be connected to the source of current associated with the relay SIG(6).

Upon the closing of the aforedescribed circuit, condenser 113 of the surge generator will discharge and an oscillatory current, having a peak amplitude of the order of four amperes, will flow over the circuit and will cause the firing of the tubes RT, FTT3, FUT1, VGT1, HGT2, VFT3 and HNTT associated with the said coils, all shown on Fig. 2. This will, in turn, cause the operation in the marker of relay R(7) of group 1, relays FT3(7) and FU1(7) of the frame tens and frame units groups, respectively, and relays VG1(7), HG2(7) and VF3(7) of the vertical group, horizontal group and the vertical file, respectively, all of which are connected to ground through the tubes RT, FTT3, FUT1, VGT1, HGT2, VFT3 and HNTT that have just been fired. The mode of operation of those relays is identical with the mode of operation of the relays of the same groups during the process of seeking a wanted non-P. B. X subscriber's line, hereinbefore described, and needs no further description.

Upon the firing of tube HNTT the hunt relay HNT(7) will be operated and will lock through the off-normal ground ONG1(7). By the closing of contact 2 of relay HNT(7) the lead 144 will be grounded upon the off-normal ground ONG2(7), and that, in turn, operates relay H0(11). Relay HNT(7), by the opening of its contact 1, also releases the operated information relays R(7) to VF3(7) of Fig. 7. Upon operating, relay H0(11) opens its contacts 0 to 9 and closes its contact 10. The opening of contact 5 of H0(11) opens the circuit that extended from ground on the armature of relay RU5(11) through contact 35 of relay MCA(9) and the windings of relays U5(6) and US(6), thereby releasing the latter two relays and also relay SIG (6). The release of the last relay returns to normal the signal surge circuit.

Upon the releasing of the unit relay U5(6), and the opening of its contact 1, the operating ground will be removed from relay UA(7) thereby releasing that relay. The release of relay UA(7) closes the circuit through the winding of the slow-operating relay TMS(9), the said circuit extending from battery upon the winding of relay TMS(9) and including that winding, leads 131 and 128, contacts 1 of relay ROPN(7) and UA(7), lead 145, and contact 10 of relay H0(11) to ground G5. Since relay TMS(9) is of the slow-operating type it permits the operation of relays STA(10), STB(10), OPN(6), EA(6) and EB(6) as well as the S(10) and HT(10) relays during the interval of time between the release of relay UA(7) and the operation of TMS(9). Relays STA(10) and STB(10) are operated over a circuit that includes battery, the windings of those relays, lead 128, contacts 1 of relays ROPN(7) and UA(7), lead 145 and contact 10 of relay H0(11) to ground G5. The operating circuit of relay OPN(6) includes battery, the winding of that relay, lead 173, contact 56 of relay NCB(7), lead 174, contacts 1 of relays ROPN(7) and UA(7) to ground G5. Relays EA(6) and EB(6) are operated over a circuit that extends from the negative battery on their windings and includes the windings, leads 175, 173, contact 56 of relay MCB(7), lead 174 and contacts 1 of ROPN(7) and UA(7) to ground G5.

When relay STA(10) operated, it connected ten sleeve leads from the sleeve connecting relays SC00(5), SC01(5), etc., to the sleeve relays S0(10) to S9(10), and since relay SC01(5) is now operated (having operated at the same time the tens block relay TB00-01(4) operated), those sleeve relays which are connected through relay SC01(5) with idle P. B. X lines, will operate. Relay OPN(6), upon operating, disconnects the ground G3 from the hunt terminal strip 158(1) and then connects the battery B2 to that terminal strip through the group of ten resistances, the contacts 0 to 9 of relay OPN(6) and the contacts of relays EA(6) and OA(6). Relay STB(10), upon operating, connects the windings of relays HT0 to HT9, shown on Fig. 10, to the contacts of the tens block relay TB00-01 shown on Fig. 4 (which relay is now operated), the connection including contacts 20 to 29 of relay MCA(9), whereby the relays of the HT groups can operate through the connection to those terminals that correspond to the P. B. X lines being hunted.

Those will be the terminals on the hunt terminal strip 158(1) which correspond to the first or the intermediate lines of a group of lines extending to a given P. B. X but not to the last line of that group because the jumper of the last line (and also those of all non-P. B. X lines) is connected to the non-hunting terminal strip 110(1).

Accordingly, since the trunk numbers which have been assumed for the purpose of illustration are 015 to 018, inclusive, the jumpers for trunks 015 to 017, inclusive, will terminate on the hunt terminal strip 158 and trunk 018 upon the non-hunt terminal strip 110(1). Thereupon relays HT5(10) to HT7(10), inclusive, will be operated but relay HT8(10) will not be operated. The operating circuit for relay HT5 extends from ground G7 and includes conductor 130, the winding of relay HT5, contact 5 of relay STB(10), cable 129, contact 25 of relay MCA(9), contact 5 of relay TO(4), contact 15 of relay TB00-01(4), cable 133 to terminal 015 upon the directory number terminal strip, thence over jumper J2 to terminal 015 upon the hunt terminal strip 158(1), contact 5 of relay OA(6), conductor 125, contact 5 of relay OPN(6), the resistance associated therewith, and battery B2. In like manner, relays HT6(10) and HT7(10) would be operated. Relay HT8(10) would not be so operated because its jumper J8 is terminated upon terminal 018 of the non-hunt terminal strip, which is not connected to battery as are the circuits of the other HT relays.

Assuming that trunk 015 is busy and that the remaining trunks of that group are idle, relay S5(10) would not be operated but relays S6(10) to S8(10), inclusive, will be operated, the operating circuit extending from ground G7 and including the windings of relays S6(10), S7(10) and S8(10), and the sleeve leads extending through the contacts 6, 7 and 8, respectively, of relays STA(10), TTC(10), SC01(5), to negative battery upon the hold magnets of the cross-bar switches which represent the trunks 016 to 018, inclusive.

After relays HT5(10) to HT7(10) and S6(10) to S8(10) have had time to operate, relay TMS(9) will complete its operation and will operate relay RST(10); thereupon relay L6(10) will be operated over a circuit that includes battery, the winding of L6(10), contact 2 of relay S6(10), contact 1 of relay HT5(10), contact 1 of relay L5(10) (which is unoperated), contact 1 of relay S5(10), lead 164, contact 5 of relay RST(10), cables 147 and 143 to ground upon the hunt register relay RU5(11). Relay L6(10) locks through the chain of contacts of the L group of relays, lead 132 and contact 1 of relay JH(7) to the off-normal ground ONG3(7). Relay L6(10) thereupon effects the operation of relay ROPN(7), the operating circuit extending from battery and includes the winding of ROPN(7), lead 151, the varistor V6(10), lead 170, contact 4 of relay L6(10) and ground G7. The opening of contact 1 of relay ROPN(7) releases relays OPN(6), EA(6), EB(6), STA(10), STB(10) and TMS(9), but relays OA(6) and OB(6) do not release. The closing of contact 2 of relay ROPN(7) causes the operation of relay TM(7) which is of the slow operating type. Before relay TM(7) operates, the release of relays STA(10) releases the operated relays of the S group, Fig. 10; and likewise the release of relay STB(10) releases the operated relays of the HT group. The release of relays OPN(6), EA(6) and EB(6) removes battery from the terminals of the hunt terminal strip shown on Fig. 1. Through the closing of contact 1 of relay TM the off-normal ground ONG4 will be connected to the winding of relay RPG(7) which thereupon locks through its contact 2 to the off-normal ground ONG5. The closing of contact 1 of relay RPG(7) prepares a locking circuit for the register relays FT, FU, etc., which locking circuit extends from ground upon contact 2 of relay JHK(7), contact 1 of relay RPG(7), and conductor 126 to which the locking contacts of the said register relays are connected.

The closing of contact 2 of relay TM(7) grounds conductor 152 which is connected to the winding of the sleeve test connector relay STC(10) and causes that relay to operate. Thereupon a circuit will be closed which extends from ground G7(10) and includes contact 4 of relay L6(10), lead 170, contact 6 of relay STC(10), lead 6 in cables 177 and 142, contact 36 of relay MCA(9), lead 6 in cable 178 to the winding of the units relay U6(6) and relay US(6) to battery. Thereupon relay US(6) will operate and, thereafter, relay U6(6).

Thereupon relay U6(6) closes a circuit by which a changing current will be sent through the jumper J3 which is associated with trunk 016 and assists in enabling the marker to locate upon the line-link frame the first non-busy trunk, viz., No. 6, of the group of trunks that extends to the given P. B. X. The circuit from the generator extends from the armature of relay SIG(6) and includes lead 108, contact 2 of relay U6(6), lead 6 in cable 149, contact 16 of relay TO(4), contact 16 of relay TB00-01(4), lead 016 in cable 133 to terminal 016 of the directory number terminal strip 111, the jumper J3 to terminal 016 of the hunt terminal strip 158, passing through coils RC, FTC3, FUC1, VGC1, FU1, HGC2, VFC4, and hunt coil HNTC (all shown on Fig. 2), contact 6 of relay OA(6), contact 3 of relay U6(6), contact 10 of relay OPN(6) and ground G3. The tube T18 will be fired, relay SIG will be operated and condenser 113 will discharge, sending a surge of current through jumper J3 which will induce a voltage in the coils through which the jumper passes, and will fire the tubes associated with the several coils. Thereupon the register relays R, FT3, FU1, VG1, HG2, VF4, and HNT, all shown on Fig. 7, will be operated in the manner previously stated and will lock to ground upon contact 2 of relay JHK(7). The operation of those register relays will operate the work relays in the marker (not shown) which thereupon will, directly or indirectly, seize trunk No. 6 upon the line-link frame in the manner fully described in the copending application of Busch heretofore mentioned.

If all trunks of the group 015 to 018 are busy, the corresponding sleeve relays S5(10) to S8(10) remain unoperated, after relay STA(10) has operated, in the course of operations mentioned hereinbefore, but relays HT5(10) to HT7(10) operate after relay STB(10) has operated, the operating circuit for relays HT5(10) to HT7(10) extending from battery B2(6) through contacts 5 to 7, inclusive, of relay OPN(6), contacts 5 to 7, inclusive, of relay OA(6), terminals 015, 016 and 017, of the hunt terminal strip 158(1), jumpers J2, J3 and J7 extending from the said terminals to the same numbered terminals on terminal strip 111(3), contacts 15 to 17, inclusive, of relays TB00-01(4) and TO(4), contacts 35 to 37, inclusive, and also contacts 25 to 27, inclusive, of relay MCA(9), contacts 5 to 7, inclusive, of relay STB(10), windings of relays HT5(10) to HT7(10) to ground G7. Relay HT8(10) does not operate upon the operation of relay STB(10) since the circuit that extends from the winding of HT8(10) and includes contact 8 of relay STB(10), contact 28 of relay MCA(9), contact 18 of relay TB00-01(4), jumper J8, terminal 018 of the non-hunt terminal strip 110(1) and contact 4 of relay U8(6), is open at the latter contact. Accordingly, a circuit is established that extends from ground upon the armature of the register unit relay RU5(11) and includes lead 5 in cables 143 and 147, contact 5 of relay RST(10), lead 164, contacts 1 of relays S5, L5 and HT5, and the same numbered contacts of relays S6, L6, HT6, S7, L7, HT7, and S8, L8, in succession, the armature of relay HT8, contact 2 of that relay, lead 134, contact of relay GD(10) to a relay (not shown) which operates to indicate to the marker that the line is busy. Since this feature forms no part of the present invention, further description of it is deemed unnecessary. The relative times of operation of the various relays hereinbefore mentioned, are shown in the relay operating sequence chart, Fig. 13.

*Method of hunting an idle P. B. X trunk in a group of trunks in consecutive tens blocks*

(Relay Operating Sequence Chart Fig. 14)

When a group of P. B. X trunks extends beyond the initial tens block and all trunks in the initial block test busy, a test for an idle trunk for all-trunks-busy condition must be made in the next succeeding block, starting with the first trunk in that block. If, in testing a plurality of trunks extending to the same P. B. X it is found that, starting with the relay of the HT group corresponding to the units digit of the called line, all the succeeding HT relays, including relay HT9(10) are operated, it indicates that the group of trunks assigned to that P. B. X does not terminate with trunk No. 9 but extends into the next consecutive tens block of terminals. If trunk No. 9 were the last trunk of the group, relay HT9(10) would remain unoperated because, as mentioned hereinbefore, the winding of the HT relay associated with the last trunk of a P. B. X group is never connected to battery on the hunt terminal strip 158 but to ground upon the regular, i. e., the non-hunt terminal strip 110.

To follow the operation involved in hunting in consecutive tens blocks, assume that the block of trunks being tested begins with No. 5 trunk (having the directory number 015) in the second tens block which is identified with relays TB00-01(4) and SC01(5), and that all trunks up to and including No. 9 are busy. The sequence of operations will be the same as for the case previously described (all trunks in the same tens block) up to the point where relay TMS(9) operates except that relays HT5(10) to HT9(10) will be operated and relays S5(10) to S9(10) and L5(10) to L9(10) will not be operated. Accordingly, the marker proceeds in the following manner to test the trunks of the same P. B. X group which terminate in the next tens block, viz., tens block 01, of terminals. A circuit will be established from ground on the armature of relay RU5(11) which will include the No. 5 lead in cables 143 and 147, contact 5 of relay RST(10), contacts 1 of relays S5(10), L5(10) and HT5(10), the same numbered contacts of the other S, L and HT relays up to and including contact 1 of relay HT9(10), lead 157 and the winding of relay AH(9), thereby causing the operation of the later relay, which locks on its upper winding and in turn effects the operation of relays AH1(9) and also RLT(9). Relay AH1(9) locks to ground on the armature of relay AH5(9) and relay RLT(9) locks through the off-normal ground ONG6. By the opening of contact 2 of relay RLT(9), ground G6 is removed from the winding of relay RST(10), thereby releasing that relay so that even if a trunk becomes idle and an L relay (Fig. 10) operates, the following described action will not be interfered with. Relay AHI(9) is slow to operate so that it will not operate until after RST(10) has had time to release.

Relay AH(9) will be released upon the operation of relay AHI (9). Up to the moment of operation of relay AHI(9), the tens block relay TB00-01(4) and the sleeve connecting relay SC01(5) which were operated when the marker seized the number group, remain operated through a circuit that exends from ground on the armature of relay AHI(9) and includes contact 5 of AHI, lead 104, the chain of contacts 1 of relays TC2(9) to TC9(9), contact 2 of relay TCI(9), contact II of relay MCA(9), contact I of relay HB0(4), and windings and battery of relays TB00-01(4) and SC01(5). After relay AHI(9) operates, this circuit is opened and relays TB00-01(4), SC01(5) and TO(4) release, and, in turn, release any operated relays of the HT and S groups, Fig. 10.

Upon the operation of relay AHI(9), the circuit will be closed through the winding of relay RA(9), contact 3 of relay AH2(9) and contact 4 of relay AHI(9) to ground, thereby operating relay RA(9) and opening the 10 leads that extend from the windings of the group of TC relays to the contacts of the tens group of relays RT0(11) to RT9(11). Relay TCI which was previously operated under the control of relay RTI(11) is not released because it is locked through its contact 3 to the off-normal ground ONG3, the locking circuit including the winding of TBT1(9). The latter relay, as previously mentioned, did not operate because its winding was shunted by the path to ground through the contacts of relay RA(9) and the armature of relay RTI(11). When relay RA(9) has operated, following the operation of AHI(9), the shunt path is opened and relay TBT1(9) will then receive sufficient current to operate it and effect the closing of its contact 1, the purpose of which will be presently stated; relay AH2(9) will be operated through contact 3 of relay AHI(9) which is locked to ground through contact 2. Relay AH2(9) is slow operating to allow the initial TB and SC relays, viz., TB00-01(4) and SC01(5), and also relays of the HT and S groups time to release before they are reoperated as described later. Upon the opening of contact 3 of relay AH2(9) relay RA(9) will be released and the ten leads to the TC group of relays and the TBT group of relays will be closed. Thereupon a circuit will be established from ground on the armature of relay RHI(11) through contact I of relay RA(9), contact I of relay TBT1(9), contact 2 of relay TBT2(9) and the winding of relay TC2(9) and battery, thereby effecting the operation of the latter relay which will open its contact I and close its contacts 2 and 3. Through the latter contact relay TC2(9) will be locked upon the off-normal ground ONG3. Relay AH2(9) also operates relay AH3(9) which is slow to operate in order to give relay TC2(9) time to operate, as described heretofore. Relay AH3(9) will operate the next successive tens block relay TB02-03(4) and the next sleeve connecting relay SC02(5), the operating circuit of which may be traced from the battery and winding of each of those relays through contact 2 of relay HB0, contact 12 of relay MCA(9), contact 2 of relay TC2(9), and the chain of contacts I of the successive TC relays and the lead 104 to ground upon relay AH3(9). Relay TE(4) will be operated since the tens block has changed from an odd number to an even number.

After relays TB02-03(4) and TE(4) operate, circuits are again closed for the relays of the HT group, Fig. 10, and after relay SC02(5) operates, circuits are again closed for relays of the S group, as described before. Relay AH4(9) will be operated by relay AH3 and through contact I it will ground the lead 155 that extends to the 0 contact of relay RST(10) so that hunting through the new tens block will start with the 0 trunk on that block. That circuit may be traced from ground upon the armature of relay AH4(9), through contact I, lead 155 to the 0 contact of relay RST(10), thence to the armature of relay SO(10). Assuming that the trunk connected to terminal 020 of the sleeve connecting relay SC02(5) is idle, a circuit will be established from negative battery on the hold magnet of the cross-bar switch upon which the trunk terminates, which will extend over lead 020, contact 0 of relay SC02(5), contacts 0 of relays TTC(10) and STA(10) and the winding of relay S0(10) to ground G7, thereby operating the latter relay.

With relay S0(10) operated, relay L0(10) will be operated when relay AH4(9) operates. The circuit for relay L0(10) extends from battery through the winding of relay L0(10), contact 2 of relay S0(10), leads 160 and 155 to ground through contact I of relay AH4(9). Relay L0(10) will lock through its contact 2 and over a chain of similar contacts of relays LI to L9, inclusive, and leads 132 to the off-normal ground ONG3. The closing of contact 4 of relay L0(10) establishes a circuit from ground G7 through the said contact and extending over lead 161 to the varistor V0(10), lead 151 to the winding and battery of relay ROPN(7), thereby operating the latter relay, which releases relays STA(10), STB(10), OPN(6) and TMS(9). Relay STA(10) releases the S relays and relay TMS(9) releases relay RST(10). Relay OPN(6) disconnects battery from the circuits in which are included relays of the group HT0 to HT9, of Fig. 10, and thereby releases those relays. The closing of contact 2 of relay ROPN(7) grounds the winding of relay TM(7) and thus operates that relay. The closing of contact I of TM(7) operates relay RPG(7) which locks through the off-normal ground ONG5. Relay RPG(7), by closing its contact I, establishes a locking circuit for the register relays of groups I to 7, shown on Fig. 7, thereby preparing for the locking of those relays by the surge of current that will presently flow through the coils through which the jumper J4, associated with the trunk connected to terminal 020, has been threaded.

The closing of contact 2 of relay TM(7) puts a ground on the lead 152 which operates relay STC(10) and closes its contact 0 to 9; thereupon a circuit will be established extending from the ground G7, through contact 4 of relay L0(10), lead 161, contact 0 of relay STC(10), cables 177 and 142, contact 30 of relay MCA(9), the 0 lead of cable 178, and the windings of relays U0(6) and US(6). Relay US(6) thereupon operates and by the shorting of one of its windings, relay U0(6) will be operated.

The release of relay OPN(6) upon the operation of relay ROPN(7) previously mentioned, effected the connection of the ground G3 to the contacts 3 of the various units relays U0(6) to U9(6), inclusive. Accordingly, the circuit from ground G3 will be extended through contact 3 of relay U0(6) and contact 0 of relay EA(6) to terminal 020 upon the hunt terminal strip 158 and thence through the jumper J4 to terminal 020 upon the directory number terminal strip, Fig. 3, thence through contact 0 of the tens block relay TB02-03(4), contact 0 of relay TE(4), the 0 lead of cable 149 to contact 2 of relay U0(6), thence over the lead 198 and through the armature of relay SIG(6) to the resistance 171. The ground connected to that resistance operates the tube T18 which, in turn, operates relay SIG(6). The operation of that relay transfers the jumper J4 to the surge generating circuit in the manner fully described hereinbefore. A surge of current will thereupon flow over that circuit and will set up in each of the coils RC', FTC3, FUC2, VGC2, HGC2, VFC3 and HNTC through which the jumper J4 is threaded, a voltage that will fire the tubes associated therewith and that in turn will effect the operation of the register relay that is associated with each of said coils, all of which relays will lock to ground through contact 2 of relay JHK(7), the circuit of which has been previously traced.

The operation of the said register relays, will, in turn, operate the work relays in the marker that will directly or indirectly seize the trunk that has been identified as to its frame location, its vertical and horizontal group location, and its vertical file position.

In the foregoing description it has been assumed that the first trunk upon the new tens block, upon which hunting continued, was found to be idle. If, however, the first trunk is not idle, testing will be continued through the successive trunks of that tens block up to and including trunk number 9. If no trunks of that block are found upon test to be idle, it will be necessary to pass to the next higher numbered tens block, viz., TB03(4) and to continue the test for an idle trunk in the group 030 to 039, the method of doing which is similar to that pursued in passing from the tens block TB01(4) to the tens block TB02(4) and testing therein as hereinbefore described. The sequence of operation of the various relays is as indicated upon the chart, Fig. 14.

*Method of operation in jump hunting for an idle P. B. X trunk*

(Relay Operating Sequence Chart, Fig. 15)

Occasionally it may be necessary to test for an idle trunk in a group of P. B. X trunks all of which extend to the same P. B. X but which are not connected to consecutive terminals upon the same or even upon consecutive tens block relays. For example, such a group of trunks may be divided into two subgroups, the trunks of one of which subgroups may terminate upon the first five terminals of one tens block relay and the trunks of the other subgroup may terminate upon the first five terminals of the next higher numbered tens block relay, the intervening terminals of the first tens block relay being connected to trunks extending to another or other P. B. X's. The two subgroups of trunks may even be on different hundreds block relays. Accordingly, if all trunks terminating upon the initial tens block relay are found to be busy, it will be necessary to jump to the other, higher numbered tens block relay upon which the remainder of the group of trunks is connected in order to continue the test for an idle trunk. That process is known as "jump hunting," and the manner in which the circuit in which the present invention is embodied operates to locate an idle trunk under jump hunting conditions is as follows:

When a group of P. B. X trunks is so divided as to involve jump hunting, the directory number of the last trunk appearing on the initial tens block relay will be lost, that is to say, the terminal corresponding to that directory number is not actually associated with a trunk. The sleeve for that terminal is connected permanently to a source of negative potential and therefore has the characteristics of an idle trunk so that if all the other trunks in the initial tens block are busy, the last one will be chosen by the marker which will attempt to get its hold magnet location. In making this attempt the marker will obtain from the number group, instead of the location of the hold magnet, the directory number to be used to obtain access to the remainder of the group of trunks extending to the particular P. B. X to which all trunks of the group extend. It will then use that number to find an idle trunk.

Let it be assumed that a portion of the group of trunks extending to a P. B. X terminate upon the tens block which is represented by terminals 020 to 029 of the sleeve connecting relay SC02(5) and that the remainder of the trunks lies in the tens block represented by terminals 030 to 039 of relay SC03(5). Let it further be assumed that the trunks that terminate upon the first-mentioned tens block relay are connected to terminals 020 to 026 and that the remainder of the trunks to the same P. B. X begins with terminal 030 of the succeeding tens block. Accordingly, in testing for an idle trunk in such a group of trunks, it will be necessary, after testing the trunks connected to terminals 020 to 026, to jump from terminal 026 to terminal 030, and to continue the search, beginning with the latter terminal.

It will be assumed that the windings of the hold magnets which are connected to terminals 020 to 025 of the sleeve connecting relay SC02(5) will be grounded or connected to a source of positive potential so that they will, upon testing, indicate that those trunks are busy. Accordingly, in the manner hereinafter described, the testing will proceed to terminal 026, and since that terminal is permanently connected to a source of negative potential, it will test as idle. The marker then will attempt to find the hold-magnet location corresponding to terminal 026 and will receive instead the information that it should jump to terminal 030 and continue hunting.

Assuming that the originating register has transmitted to the marker the directory number of the first trunk of the group of trunks over which the test is to be made, the last three digits of which are 020, the marker, upon the operation of the register marker connecting relay RMC(11), will seize a number group corresponding to the thousands digit of the called number and will operate the register relays of the RH, RT and RU groups (Fig. 9), that correspond to the number set up in the originating register. In the case assumed that will result in the operation of relay RH0(11) in the hundreds group, RT2(11) in the tens group, and RU0(11) in the units group. As described hereinbefore, the marker connector relay MCA(9) will be operated by a marker preference relay (not shown) and thereafter relay MCB(7) will operate. The operation of relay RH0(11) effects the operation of the hundreds block relay HB0(4) through the ground on relay RH0(11). The operation of relay RT2(11) effects the operation of relay TC2(9) which, upon the closing of its contact 2, establishes a circuit from battery and the windings of the tens block relay TB02–03(4) and also the sleeve connecting relay SC02(5) that extends through said contact 2 of relay TC2(9), the chain of contacts 1 of relay TC3(9) to relay TC9(9) and to the ground contact 5 of relay AH1(9). Hence relays TB02–03(4) and SC02(5) operate. Since the tens digit is an even number, relays TE(4), EA(6) and EB(6) will also be operated. The operation of relay RU0(11) grounds the circuit that extends from battery upon the winding of relay US(6), and includes the winding of the unit relay U0(6), the 0 lead in cable 176, contact 30 of relay MCA(9), and the 0 lead of cable 142, thereby operating first the US(6) and then the U0(6) relay. Through the operation of the U0(6) and TB02–03(4) relays a circuit will be closed from the resistance 171 of the generator (Fig. 6) and will include contact 1 of relay SIG(6), contact 4 of relay U0(6), the 0 lead in cable 149, the 0 contact of relay TE(4), the 0 contact of relay TB02(4), terminal 020 upon the directory number terminal strip 111, the jumper J4 extending through coils RC', FTC3, FUC2, VGC2, HGC2, VFC3 and HNTC to terminal 020 upon the hunt terminal strip 158 which will be connected through the closed contact 0 of relay EA(6), contact 3 of relay U0(6), contact 10 of relay OPN(6) to the ground G3 which completes the circuit from the surge generator. Upon the closing of that circuit, the T18 tube will operate relay SIG(6), condenser 113 in the generator will discharge and an oscillatory current will flow over the jumper J4 which will cause the firing of the tubes associated with the coils through which the jumper J4 passes. Since the jumper J4 extends through the hunt coil HNTC(2), relay HNT(7) will be operated and lock through the off-normal ground ONG1. The operation of relay HNT(7) in turn effects the operation of relay H0(11) by connecting the winding of that relay to the off-normal ground ONG2. Upon the operation of relay H0(11) and the opening of its contacts 0 to 9 the circuit will be opened that extends from ground on the armature of relay RU0(11) through the 0 lead of cables 142 and 178 to the windings of relays U0(6) and US(6), thereby releasing the latter two relays. The releasing of relay U0(6) releases relay UA(7). The release of relay UA(7) closes the circuit through the winding of the slow-operating relay TMS(9), the operating circuit extending from battery on the winding of relay TMS(9) and includes that winding, leads 131 and 128, contacts 1 of relays ROPN(7) and UA(7), lead 145 and ground G5 on contact 10 of relay H0(11). Since relay TMS(9) is of the slow-operating type it permits the operation of relays STA(10), STB(10), OPN(6), OA(6) and OB(6) as well as the relays of the S(10) and HT(10) groups during the interval of time between the release of relay UA(7) and the operation of relay TMS(9). Relays STA(10) and STB(10) are operated over a circuit that includes battery, the windings of those relays, lead 128, contacts 1 of relays ROPN(7) and UA(7), lead 145 and ground G5 upon contact 10 of relay H0(11). The operating circuit of relay OPN(6) includes battery, the winding of that relay, lead 173, contact 56 of relay MCB(7), lead 174, contacts 1 of relays ROPN(7) and UA(7), lead 145 to ground G5. Relays OA(6) and OB(6) also are operated over a circuit that extends from the negative battery on their windings, and includes those windings, leads 175 and 173, contact 56 of relay MCB(7), lead 174, and contacts 1 of ROPN(7) and UA(7) to ground G5 upon relay H0(11).

When relay STA(10) operated, it connected ten sleeve leads from the sleeve connecting relays SC00(5), SC01(5), etc., to the sleeve relays S0(10) to S9(10), and since relay SC02(5) is now operated (having operated at the same time the tens block relay TB02–03(4) operated), those sleeve relays which are connected through relay SC02(5) with idle P. B. X lines, will operate. Relay OPN(6), upon operating disconnects the ground G3 from the hunt terminal strip 158(1) and then connects the battery B2 to that terminal strip through the group of ten resistances, contacts 0 to 9 of relay OPN(6), and the contacts of relays EA(6) and OA(6). Relay STB(10), upon operating, connects the windings of relays HT0 to HT9, shown on Fig. 10, to the contacts of the tens block relays TB02–03(4) (which relay is now operated), the connection including contacts 20 to 29 of relay MCA(9), whereby the relays of the HT group can operate through the connection to those terminals of the hunt terminal strip that correspond to the P. B. X lines being hunted. Those will be the terminals on the hunt terminal strip 158(1) which correspond to the first or the intermediate line of a group of lines extending to a given P. B. X but not to the last line of that group, because the jumper of the last line (and also those of all non-P. B. X lines) is connected to the non-hunting terminal strip 110(1).

Accordingly, since the trunk numbers which have been assumed for the purpose of illustration, are 020 to 026, inclusive, the jumpers for trunks 020 to 025, inclusive, will terminate on the hunt terminal strip 158; and the jumper of trunk 026 will terminate upon the non-hunt terminal strip 110. Thereupon relays HT0(10) to HT5(10), inclusive, will be operated but relay HT6(10) will not be operated. The operating circuit for relay HT0(10) extends from ground G7 and includes conductor 130, the winding of relay HT0, contact 0 of relay STB(10), the lead 0 in cable 129, contact 20 of relay MCA(9), contact 0 of relay TE(4), contact 0 of relay TB02–03(4), lead 159 to terminal 020 upon the directory number terminal strip, thence over jumper J4 to terminal 020 upon the hunt terminal strip 158, contact 0 of relay EA(6), conductor 125, contact 0 of relay OPN(6), the resistance associated therewith, and battery B2. In like manner, relays HT1(10) to HT5(10) would be operated. Relay HT6(10) will not be operated as mentioned above because its jumper J5 is terminated upon terminal 026 of the non-hunt terminal strip 110 and is not connected to battery as are the circuits of the other HT relays just mentioned.

Since it has been assumed that none of the trunks connected to the terminals 020 to 025, inclusive, is idle, none of the relays of the S group will be operated, and, in turn, none of the L group of relays will be operated. But since the sleeve associated with terminal 026 is permanently connected to a source of negative potential, it therefore has the characteristics of an idle trunk, and consequently relay S6(10) operated at the time relay STA(10) operated. Therefore, after relay RST(10) operates, as described above, relay L6(10) will be operated, the operating circuit extending from battery and including the winding of L6(10), contact 2 of S6(10), contacts 1 of HT5(10), L5(10) and S5(10), and the same numbered contacts of the relays of the HT, L and S groups to and including relays HT0(10), L0(10) and S0(10), thence through contact 0 of relay RST(10) and the lead 0 of cables 147 and 143 to ground on relay RU0(11).

The operation of relay L6(10) operates relay ROPN(7) through a circuit that extends from ground G7(10) through contact 4 of L6(10), the varistor V6(10), the lead 151 to relay ROPN(7), and battery. Relay ROPN(7) releases relays OPN(6), OA(6) and OB(6), STA(10), STB(10) and TMS(9). Relay STA(10) releases the relays of the S group, relays STB(10) releases the relays of the HT group, and relay TMS(9) releases relay RST(10). Through contact 2 of relay ROPN(7) relay TM(7) is then operated and that, in turn, operates relay RPG(7) which locks through the off-normal ground ONG5. The closing of contact 1 of relay RPG(7) prepares a locking circuit for the register relays of the groups 1 to 6, shown on Fig. 7, that extends from ground upon contact 2 of relay JHK(7) and includes lead 162, contact 1 of relay RPG, lead 126 to which the locking contacts of the register relays are connected.

The closing of contact 2 of relay TM(7) grounds the lead 152 which is connected to the winding of the relay STC(10) and causes that relay to operate. Thereupon relay US(6) and thereafter relay U6(6) will be operated by the closing of the circuit extending from ground G7(10) through contact 4 of relay L6(10), contact 6 of relay STC(10), lead 6 in cables 177 and 142, contact 36 of relay MCA(9) and lead 6 in cable 178 to the windings of the units relay U6(6) and relay US(6) and battery.

Relay US(6), upon operating, closes a circuit by which a surge of current will be sent through the jumper J5 which extends through the coil JHC, FTC2, FUC0, VGC3, HGC0, VFC4 and RC7 to terminal 026 upon the non-hunt terminal strip 110. The surge of current through those coils will fire the tubes associated therewith and that in turn will operate relays connected with the tubes that have been fired. The jump hunt relay JH(7) will lock through contact 4 to the off-normal ground ONG1. The operation of relay JH(7) opens its contacts 1 to 3, inclusive, and removes the ground ONG3. The opening of contact 1 opens the locking circuit of relays L0(10) to L9(10) that hitherto had been established over the lead 132, thereby releasing relay L6(10); the opening of contact 2 opens the locking circuit of the relays TBT0(9) to TBT9(9) thereby releasing relay TC2(9); the opening of contact 3 releases the register relays in the marker of the RH, RT and RU groups (Fig. 11). Relay RH0(11) releases relay HB0(4). Relay TC2(9), in releasing, releases relays TB02-03(4), SC02(5), EA(6), EB(6), and TE(4). Relay L6(10), in releasing, releases relays US(6) and U6(6) and, thereafter, relay U6 releases relay ROPN(7). The number group and marker have now dropped the original number and are ready for the new number. Through contact 5 of relay JH(7) relay AJH(7) will be operated through a circuit that includes battery, the winding of AJH(7), contact 1 of relay JHK(7), contact 5 of relay JH(7) and ground G8. The operation of relay AJH(7) (which is slow-operating in order to permit the release of the relays operated in accordance with the original number) connects the leads of the frame units group FU, the vertical group VG and the horizontal group HG to the jump hunt register circuit shown in Fig. 8. By the operation of relay AJH(7) the 10 leads from the 10 relays of the frame units group FU0(7) to FU9(7) will be connected to the hundreds register shown at the top of Fig. 8. In like manner the 10 leads from the vertical group of relays VG0(7) to VG9(7) will be connected to the tens register shown near the center of Fig. 8; and similarly the 10 leads from the horizontal group HG0(7) to HG9(7) will be connected to the units register shown near the bottom of Fig. 8. The mode of connection of the relays of the FU group, the VG group and the HG group to the registers shown on Fig. 8 and the manner in which those registers operate to perform the function of selecting the hundreds block and tens block relays and the units location of the remainder of the P. B. X trunks will be presently described.

Since the registers shown on Fig. 8 now replace the register in the marker, shown in Fig. 11, the leads extending from the hundreds, tens and units registers shown on Fig. 8 are connected to the same hundreds, tens and units terminals in the number group as those to which the leads from the register shown on Fig. 11 were connected in the operations heretofore described. Thus, the ten leads from the hundreds register at the top of Fig. 8 are connected by cable 136 to the armatures 0 to 9, inclusive, of relay MCA(9) through which the paths are established to the hundreds block relays shown on Fig. 4. Similarly, the ten leads from the tens register of Fig. 8 are connected by cable 163 to cable 102 which is connected to the armatures 0 to 9 of relays RA(9) through which the paths are established to the tens block relays shown on Fig. 4; and the ten leads from the units register of Fig. 8 are connected by cable 146 to the units leads that extend to the armatures 0 to 9 of relay RST(10) by which the translation of the unit number of the desired trunk is effected.

In order to effect the jump from the last trunk of that portion of a group of trunks terminating upon one tens block relay to the first trunk of the remainder of that group of trunks upon another tens block relay, the jumper that forms part of the circuit that is associated with the last trunk upon the initial tens block relay must be threaded through those coils of the frame units group, vertical group and horizontal group that will identify the hundreds block relay, the tens block relay, and the units location of the first trunk of the remainder of the same P. B. X group of trunks which terminate upon succeeding block relays. This is accomplished by means of the jumper J5 which is connected to the terminal of the directory number terminal strip 026, representing the last trunk of the group upon the tens block relay TB02-03(4) from which the jump is to be made to a succeeding tens block and is threaded through coils JHC, FTC2, FUC0, VGC3, HGC0, VFC4 and RC7. Upon the firing of the tubes associated with those coils and the operation of relays JH, FT2, FU0(7), VG3(7), HG0(7), VF4(7) and relay R(7), the process of finding the location of the first trunk of the remainder of the group of P. B. X trunks will be initiated. The operation of relays JH, FT2 and R7 perform no function that needs consideration;

the necessary functions are performed by relays FU0, VG3 and HG0. When relay FU0(7) operated, a circuit was established from ground G8 through contact 3 of relay FU0(7), lead 117, contact 0 of relay AJH(7), lead 0 in cable 141, to the terminal 0 upon the hundreds register (Fig. 8) thence dividing, one path including varistor V0(8), contact 1 and winding of the jump hunt register relay JHH7(8) of the jump hunt register group and the common lead to battery B18, and the other path including varistor V4(8), contact 1 and winding of the jump hunt register relay JHH4(8) to battery. Thereupon relays JHH4(8) and JHH7(8) operate and lock through contact 2 of each relay to the off-normal ground ONG7. This effects the operation of the hundreds block relay HB0(4) by establishing a circuit that extends from ground G8 and includes contacts 10 and 0 of relays JHH4(8) and JHH7(8), respectively, the jumper extending from the said contact 0 to lead 0 of cable 136, contact 0 of relay MCA(9), lead 0 to the winding of relay HB0(4) and battery. Upon the operation of relay HB0(4) all of the tens leads will be connected through the contacts of HB0(4) so as to establish circuits for the operation of any one of the ten tens block relays that fall within the hundreds block represented by relay HB0.

In similar manner, the operation of the vertical group relay VG3(7) establishes a circuit from ground G8 that includes contact 3 of relay VG3(7), contact 3 of relay AJH(7), lead 3 of cable 140 and the terminal 3 of the tens register shown on Fig. 8, thence through two branches, one including varistor V30(8), contact 1 and winding of jump hunt register relay JHT2(8) to battery, and the other branch including varistor V34(8) and contact 1 and winding of jump hunt register relay JHT1(8) to battery, thereby operating relays JHT1(8) and JHT2(8), which lock to ground ONG7. Relay TC3(9) is thereupon operated by the closing of a circuit that includes ground G9, contacts 16 and 3 of relays JHT1(8) and JHT2(8), respectively, the jumper from armature 3 of relay JHT3(8) to terminal 3 of the leads of cables 163 and 102, contact 3 of relay RA(9) and the winding of the relay TC3(9). Thereupon the tens block relay TB02-03(4) will be operated through a circuit which includes battery, winding of relay TB02-03(4), contact 3 of relay HB0(4), contact 13 of relay MCA(9), contact 2 of relay TC3(9) and the chain of contacts 1 of the subsequent TC relays to and including TC9(9), lead 104 to ground through contact 5 of relay AH1(9). The operation of relay TC3(9) also effects the operation of the sleeve connecting relay SC03(5), and relays OA(6), OB(6) and TO(4) in the manner heretofore described.

The operation of the horizontal group relay HG0(7) closes a circuit from ground G8 that extends through contact 3 of relay HG0(7), lead 119, contact 0 of the horizontal group of contacts controlled by relay AJH(7), the 0 lead of cable 139 to the 0 terminal of the units register, Fig. 8, thence through two branches, one branch leading through varistor V40(8), contact 1 and winding of jump hunt register relay JHU7(8) to battery and the other branch leading through varistor V44(8), contact 1 and winding of jump hunt register relay JHU4(8) and battery, thereby operating relays JHU7(8) and JHU4(8) which lock upon the off-normal ground ONG7. The operation of the latter two relays connects ground G10 to armature 0 of relay RST(10), the connection including contacts 18 and 0 of relays JHU4 and JHU7, respectively, and the lead 0 of cable 146.

Upon the operation of relay JHU7(8) and the closing of its contact 3, relay JHK(7) will be operated by the grounding of its winding at G11. The operation of relay JHK(7) releases relay AJH(7) but this does not release the relays of the jump hunt register (Fig. 8) that have been operated because they remain locked through ground ONG7. Through contact 3 of relay JHK(7) a ground is put upon the lead 132 which establishes the locking circuit for the L group of relays shown on Fig. 10 when they shall have been operated; in like manner by the closing of contact 4 a ground at G15 would be put upon the lead 150 which furnishes the locking ground for the relays of the TBT group shown in Fig. 9 when those relays shall have been operated. Relay JHK(7) releases the number group information relays of Fig. 7 so that they will be ready for reuse and releases relay UA(7). Upon the release of relay UA, relays EA(6), EB(6), STA(10), STB(10) and OPN(6) operate. Relay TMS, which is slow-operating, will operate in a fixed interval of time thereafter. Relay STA(10) connects the relays of the S group to the sleeves of the trunks shown on Fig. 5 and relay STB connects the relays of the HT group to the contacts of relay TB02-03(4).

Since the information regarding the location of the first trunk of the remainder of the group of trunks is now registered upon the jump hunt register shown in Fig. 8 by the operation of the specified relays of that register, the system will function thereafter in the same manner in which it functioned when the number of the wanted P. B. X trunk was registered upon the marker register relays shown in Fig. 11.

Since it has been assumed that the trunk connected to terminal 030 is an idle trunk, the negative potential of battery B11 will be applied through hold magnet HM4(5) of that trunk to winding of relay S0(10) of the sleeve test circuit thereby operating that relay. After relay TMS(9) has operated as described, relay RST(10) will be operated, closing its ten contacts and connecting the leads associated therewith to the terminals of the units register of the jump hunt register, Fig. 8, the 0 terminal of which is grounded by a circuit that extends through the contacts 0 and 18 of the relays JHU7(8) and JHU4(8) of the register. Accordingly, relay L0(10) will be operated by the closing of a circuit extending from battery and including the winding of relay L0(10), contact 2 of relay S0(10), lead 160, contact 0 of relay RST(10), cables 147 and 146, thence through contact 0 of relay JHU7 and contact 18 of relay JHU4(8) to ground G10. Relay L0(10) will be locked through a circuit that includes the chain of contacts of the other relays of the L group, conductor 132, contact 3 of relay JHK and the off-normal ground ONG8. The operation of relay L0(10) effects the operation of relay ROPN(7) through a circuit from ground G7 that includes contact 4 of relay L0(10), lead 161, the varistor V0(10), the lead 151 and the winding of relay ROPN to battery, thereby operating the latter relay. Relay TM(7) which is slow-operating, will thereupon be operated by relay ROPN and through contact 1 of relay TM relay RPG will be operated and will lock to the off-normal ground ONG5. The opening of contact 1 of relay ROPN(7) releases relays EA(6) and EB(6), STA(10), STB(10), OPN(6) and TMS(9). The release of STA(10) in turn releases relay S0(10); the release of STB(10) releases relay HT0(10), and the release of TMS(9) releases relay RST(10). The operation of relay TM(7) which does not occur until after S(10) and HT(10) relays have released, also effects the operation of relay STC(10) through a circuit from ground which includes contact 2 of relay TM(7), lead 152, the winding of relay STC(10) and battery. Relay STC(10), upon operating, closes a circuit that includes the windings of relay US(6), U0(6), lead 0 in cable 178, contact 30 of relay MCA(9), cables 142 and 177, contact 0 of relay STC(10), contact 4 of relay L0(10) to ground G7, thereby operating relays US(6) and U0(6), in that sequence.

The operation of relay U0(6) establishes a circuit from the surge generator SIG that includes the lead 108, contact 2 of relay U0(6), cable 149, contact 10 of relay T0(4), contact 10 of the tens block relay TB02–03(4), lead 030 to the terminal 030 of the directory number terminal strip, the jumper J6 extending through coils RC', FTC3, FUC2, VGC2, HGC2, VFC4, and the hunt coil HNTC to terminal 030 upon the hunt terminal strip 158(1) which is connected to ground through the contact 0 of relay OA(6), and contact 3 of relay U0(6). Thereupon a surge of current will flow through the jumper J6 which will induce a voltage in the coils through which the jumper is threaded which will fire the tubes associated therewith, and, in the manner heretofore described, relays R(7), FT3(7), FU2(7), VG2(7), HG2(7) and VF4(7), which are connected to those tubes, will be operated. Thereupon the work relays of the marker will be operated to identify the location of the wanted P. B. X trunk 030 upon a line-link frame and to effect its connection to an intra-office trunk by which the connection to the calling subscriber's line will be made.

If it is found that the trunk 030 is busy, then the hunt for an idle trunk will continue through the remainder of the trunks upon the tens block 030–039, and, if necessary, be continued into the next consecutive tens block. The method of hunting for an idle trunk after a jump hunt has been made and the first trunk found to be busy, is as follows:

Referring to the relay sequence chart, Fig. 15, which shows the sequence of relay operation for a P. B. X jump hunt, it will be seen that upon the operation of the slow-operating relay TMS(9), relay RST(10) will operate, and that, in turn, will operate the relay of the L group (Fig. 10) that corresponds to the sleeve relay of the S group (Fig. 10) that would have been operated by an idle trunk. The operation of the L relay will, in turn, operate relay ROPN(7) which will remove the hunt circuits, and by the operation of relays TM(7) and STC(10) will, in the manner hereinbefore described, indicate the location of the hold magnet of the wanted line. If, however, the trunk 030 is busy, the sleeve relay SO(10) will not be operated, and consequently, the corresponding relay of the L group will not operate upon the operation of relay RST(10). When that condition is found to exist, the sequence of operations in order to test the remainder of the trunks in tens block 030–039, and also, if necessary, those trunks terminated upon the next consecutive tens block is as shown in that part of the sequence chart, Fig. 14, to the right of the line indicated "Y" which represents the time of operation of the relay RST(10). Referring to the chart, Fig. 14, it will be seen that after relay RST(10) is operated, relay AH(9) operates, and thereupon relay RLT(9) operates, which will release relay RST(10). Relay AH(9) thereupon releases the initial tens block and sleeve connecting relays and effects the operation, in sequence, of relays AH1(9), AH2(9), AH3(9) and AH4(9) as shown on the chart. If just prior to the operation of relay AH4(9), relay S1 is operated, indicating that that trunk 031 is idle, the sequence of operations to find the location of the hold magnet of that idle trunk is as shown below the dot-and-dash line on the chart Fig. 14. If, on the other hand, all trunks in the tens block 03 are busy, no S relay will be operated and the sequence of operation is as shown above the dot-and-dash line on chart Fig. 14. As there indicated, upon the operation of relay AH4, relay AH5 will operate, which releases in sequence relays AH1 to AH5, inclusive. Relay AH1 thereupon reoperates and a new cycle of operation occurs as indicated by the dotted line. That cycle will continue until an idle trunk is found which will be evidenced by the operation of the S relay of the sleeve group corresponding to the idle trunk and upon the operation of relay AH4(9) the location of the hold magnet of that trunk will be obtained by the sequence of operations shown below the dot-and-dash line of chart Fig. 14.

In describing the operation of the translator circuit the tubes employed therein have been referred to as being of the gas-filled type such as cold cathode tubes. It is to be understood, however, that other types of tubes and other devices may be employed to perform the function performed by the cold cathode tubes, such as hot cathode thyratrons, transistors, or a single shot multivibrator. The main function of the tube employed in that circuit is to convert a low power current into a current suitable for operating a relay, or to perform any other desired function, and any tube or other device that will perform that function will be satisfactory.

It is desired to point out that although a specific type of generator has been disclosed as the source of current to be transmitted over the jumpers linked with the translator coils, the invention is not to be construed as limited to that type of generator since other sources may be employed for that purpose such as an alternating-current oscillator or a direct-current source connected to a jumper by the closing of one of the tens blocks and units relays. The essential requirement is a change in magnitude of the current in the jumper. A source of any type that will provide such a current could be employed.

In order to avoid using a separate and distinct relay for grounding each of the ten leads of the hundreds register, the tens register and the units register shown in Fig. 8, the relays for performing that function in the jump hunt operation, are arranged to operate on a two-out-of-five basis, by which is meant that by operating two out of five of those relays any of the ten leads may be connected to ground. The relays carry the distinguishing numerals 0, 1, 2, 4 and 7, and with one exception (noted below) the sum of the numerals of the operated relays is the same as the number of the lead that is grounded thereby. Thus, for example, if the No. 5 lead in hundreds cable 139(8) is grounded, the No. 1 relay and the No. 4 relay of the JHH group will operate; if lead No. 7 is grounded, relays Nos. 0 and 7 of the group will operate. The relationship between the digits representing the leads in the cable and the correspondingly numbered relays which operate on a two-out-of-five code basis is as follows:

| Unit No. of Lead | Nos. of Relays Operated Two-out-of-five Code |
|---|---|
| 1 | 0 and 1 = 1. |
| 2 | 0 and 2 = 2. |
| 3 | 1 and 2 = 3. |
| 4 | 0 and 4 = 4. |
| 5 | 1 and 4 = 5. |
| 6 | 2 and 4 = 6. |
| 7 | 0 and 7 = 7. |
| 8 | 1 and 7 = 8. |
| 9 | 2 and 7 = 9. |
| 0 | [1] 4 and 7 = 11. |

[1] Exception to additive scheme.

In the foregoing description of the mode of operation of the translator circuit in hunting an idle trunk and in Fig. 2 of the drawing the jumpers associated with the trunks have been shown as being threaded through one coil in each of the groups of coils instead of being threaded solely through those coils that are essential to the production of information regarding the particular trunk. The practice of threading each jumper through one coil in each group regardless of whether the interlinkage is necessary for the translation of information, has been adopted because of practical difficulties in doing otherwise. The coils are mounted horizontally on a frame, all those of the same group being at the same level, and the different groups of coils being at different levels. Assuming that the coils of group No. 1 are at the lowest level of the frame and that the remaining groups are, in succession, at higher levels, the jumper will be held in an orderly condition if they are threaded through one coil in each of the groups from the lowest to the highest level even though the interlinkage with certain coils is unnecessary for translation purposes. Furthermore, the threading of a jumper through one coil of each group simplifies the checking circuits in the marker because the marker always checks to make certain that one, and only one, coil is energized in each group of coils of the translator circuit.

Figure 1:
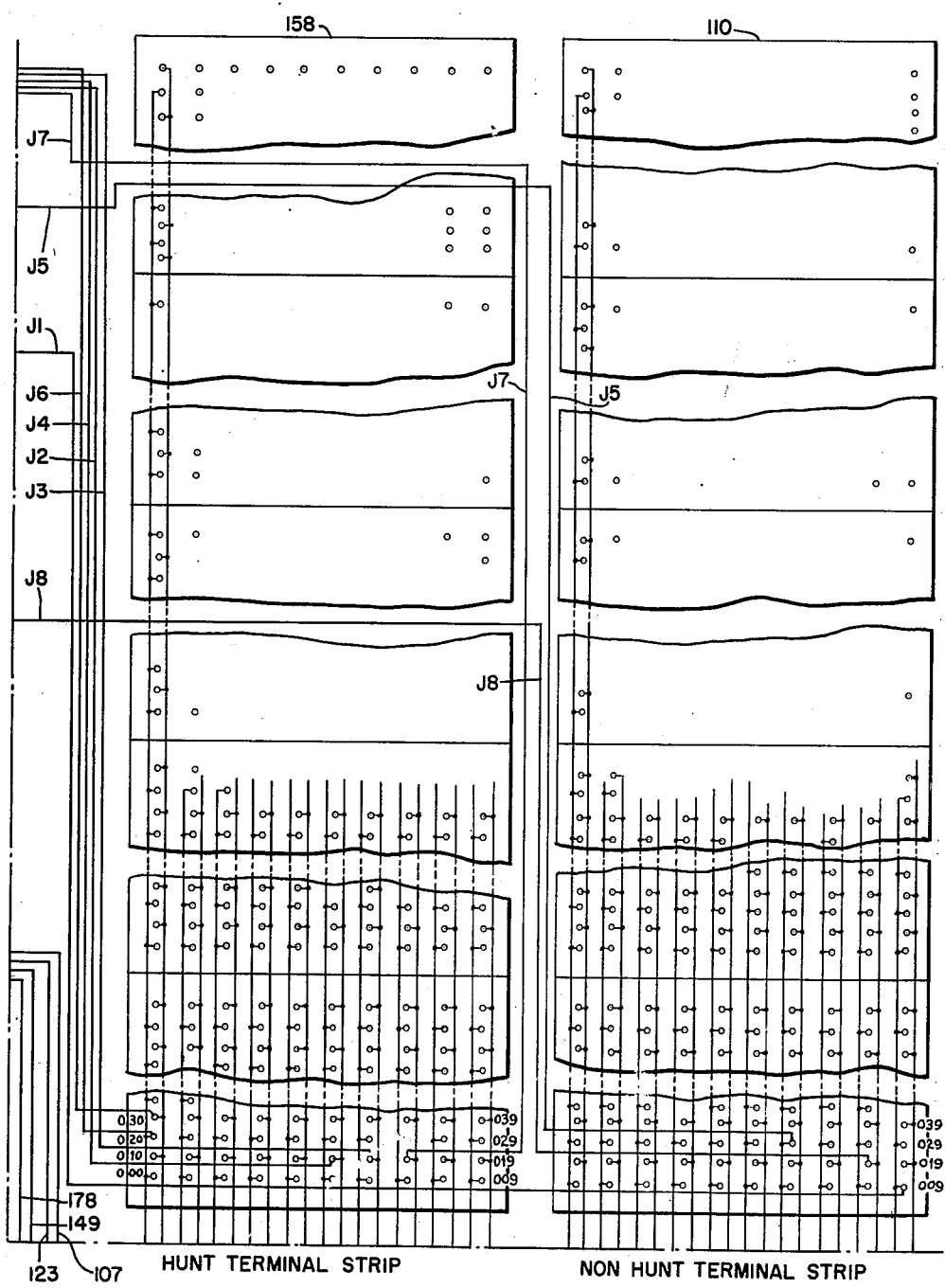
Figure 3:
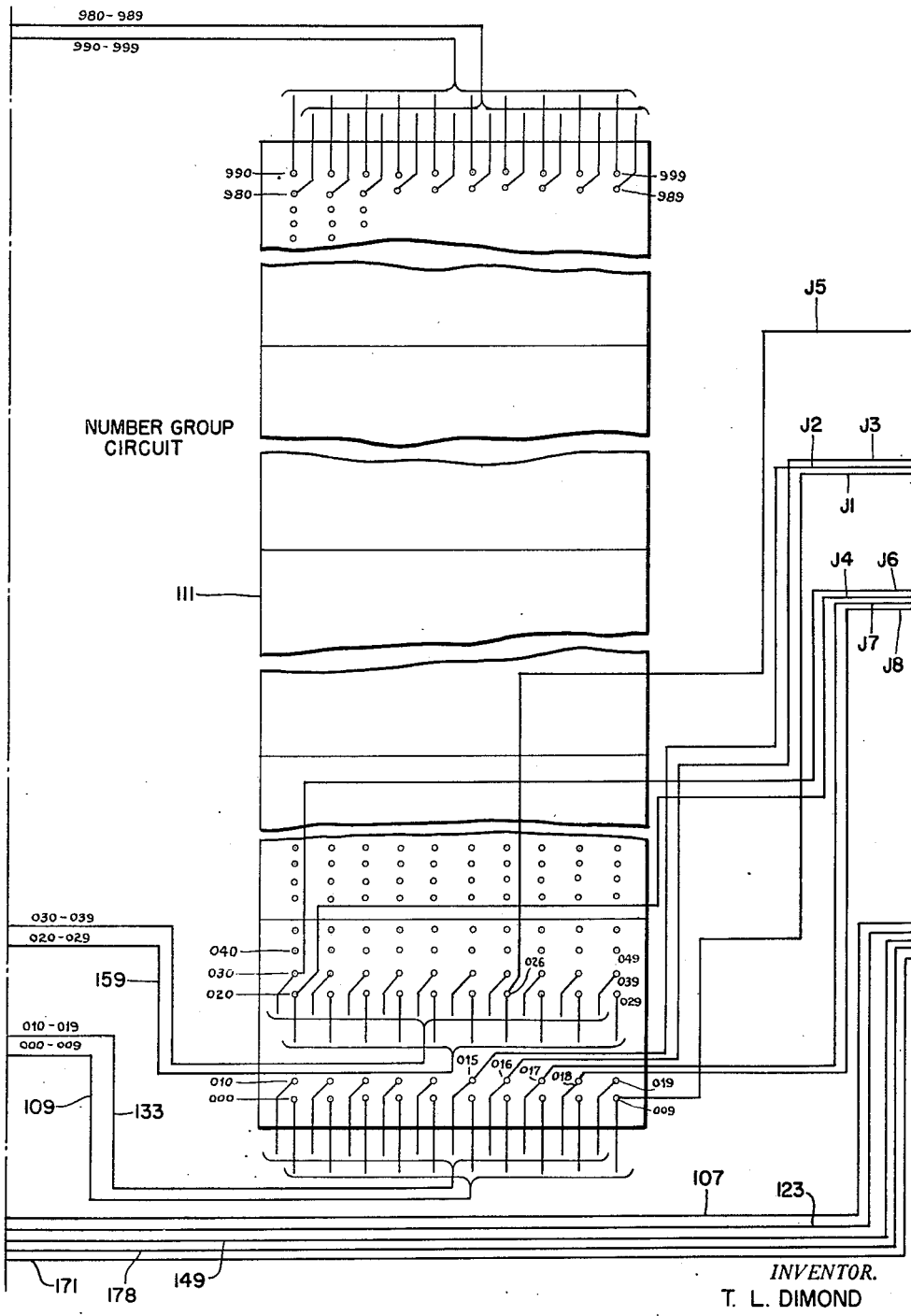
Fig. 3 shows the directory number terminal strip.
Figure 4:
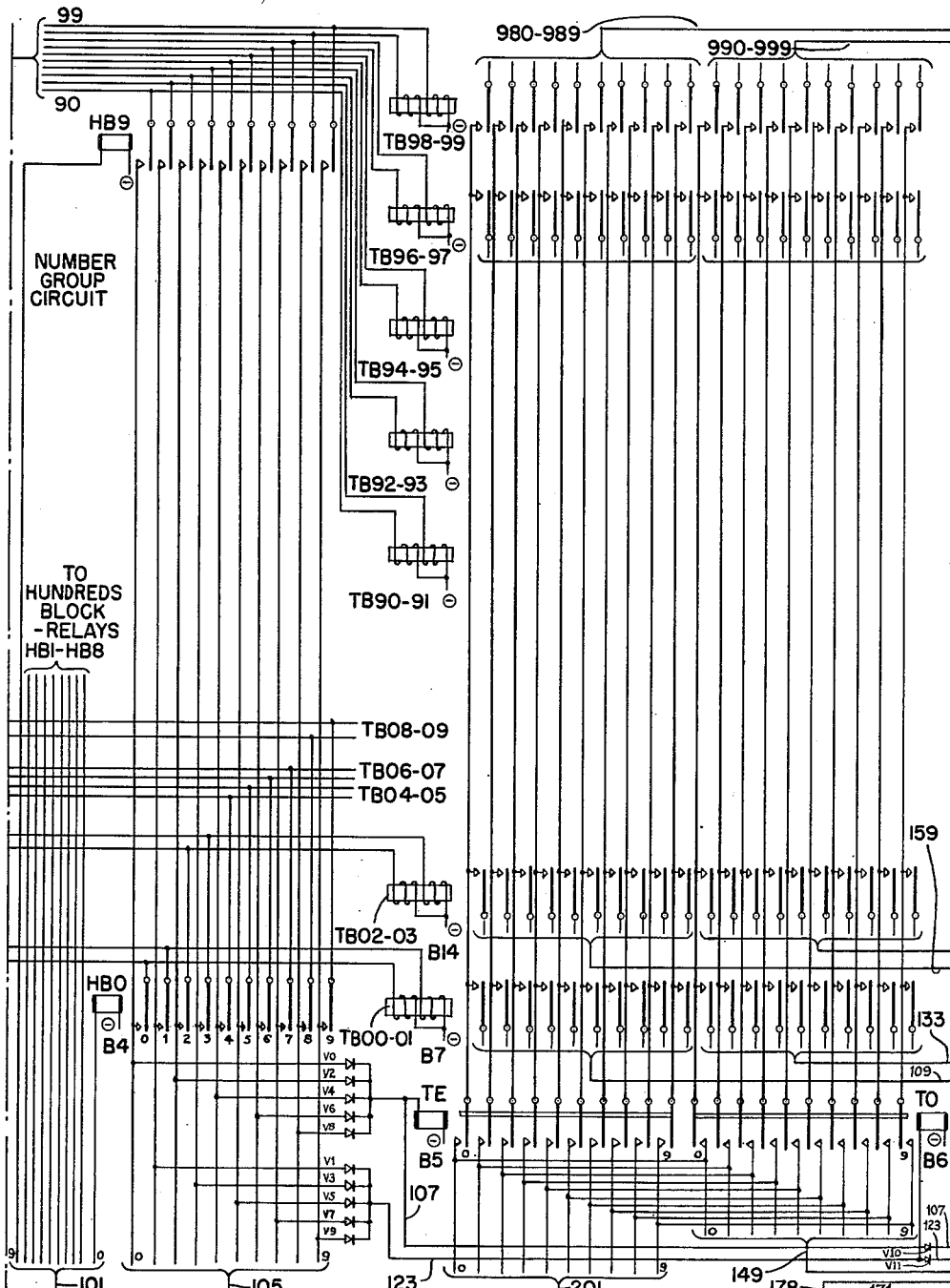
Fig. 4 shows groups of block relays responsive to relays in the dial register of the marker to establish connection between the dial register and the directory number terminal strip.

An important factor of the invention resides in the use of terminal strips such as 110 and 158 shown in Fig. 1, and particularly in the arrangement of the terminals thereon which results in the prevention of faulty operation of the translator that otherwise might occur when a pair of adjacent terminals upon the directory number terminal strip shown on Fig. 3 become crossed. In the type of strip shown in Fig. 1, all terminals having numbers ending in 0 and appearing in the even tens group, 000, 020, 040, etc., are connected to one common conductor, and similarly, all terminals having numbers ending in 0 and appearing on the odd tens group, 010, 030, etc., are connected to another conductor. A similar scheme is followed for terminals having numbers ending in 1, 2, 3, etc. As previously shown, one end of each jumper is connected to one of the terminals of the directory number terminal strip of Fig. 3, and in order for the system to function the other end of each jumper must be grounded when the surge generator is connected to the jumper so that current may be sent through the jumper. If the jumpers were permanently grounded and a cross occurred between adjacent terminals upon the directory number terminal strip (Fig. 3), a closed circuit would be created extending from ground upon one jumper, thence over that jumper to and through the cross between the terminals of the directory number terminal strip, thence over the other jumper to ground. If, during the existence of the cross, a surge of current passes over a third jumper, which is threaded through some of the coils through which are threaded the jumpers upon which the cross has occurred, a voltage will be set up in the closed circuit and the resultant flow of current thereover will effect the energizing of those coils in the translator circuit through which the latter jumpers pass, which gives a false indication. Such faulty operation of the translator is avoided by the use of terminal strips of the type shown in Fig. 1 in connection with relays such as EA, OA, etc., shown in Fig. 6. If, for example, a surge of current is transmitted through the jumper connected to terminal 045, relay EA and EB would be operated (since the tens digit, 4, is an even number), and relay U5 would also be operated since the units digit is 5. That would result in grounding the common conductor of the terminal strip to which all terminals with numbers ending in 5 and having even tens digits are connected, but the common conductor to which the odd tens terminals with numbers ending in 5 are connected would not thereby be grounded. Assuming that terminals 005 and 015 upon the directory number terminal strip (Fig. 3) are crossed, the jumper connected to terminal 005 would be grounded through the contact of relays EA and U5 because terminal 005 belongs to the even tens group. On the other hand, terminal 015 belongs to the odd tens group and it would not be grounded because the odd tens relay OA(6) is not operated. Accordingly, since only one of those jumpers is connected to ground a closed circuit could not be formed. The only situation that would give rise to a closed circuit might occur when two terminals of the even tens group or two of the odd tens group became crossed upon the directory number terminal strip. Since the even tens rows of terminals and the odd tens rows of terminals upon the directory number terminal strip occupy alternate positions thereon, and are relatively widely separated, the probability of a cross occurring between two terminals of an even tens group or of an odd tens group is believed to be quite remote.

While the invention has been described as embodied in a particular form and as applied to a particular telephone switching system, it is not to be understood or construed as being so limited since it may be embodied in other and different forms and may have other applications without departing from the spirit and scope of the invention as defined by the appended claims.

What is claimed is:

1. In a telephone switching system, in combination, a plurality of magnetic core structures each having a winding thereon, a plurality of conductors each inductively linked with one of a plurality of combinations of said core structures, the said combinations being discrete, apparatus responsive to the dialing of the directory number of a called subscriber for selecting in accordance with said directory number one of said conductors, means responsive to said selecting apparatus for applying an electrical condition to said selected conductor to induce voltages in the windings individual to the cores with which said conductor is inductively linked, and means responsive to said voltages.

2. In a telephone switching system, in combination, a plurality of magnetic core structures, each having a winding thereon, a conductor inductively linked with said core structures, apparatus responsive to the dialing of the directory number of a called subscriber to establish in accordance with said directory number a connection to said conductor, means responsive to said apparatus for applying an electric condition to said selected conductor to induce a voltage in each of the windings upon said core structures with which said conductor is inductively linked, and means responsive to the induced voltages.

3. In a telephone switching system, the combination with a plurality of coils, of a plurality of conductors each representing one of a group of directory numbers of subscribers' telephone stations, each conductor being inductively linked with a selected combination of coils, said combinations being discrete, a source of current, means to selectively establish in accordance with the directory number a connection between the said source and one of said conductors and means responsive to the voltage induced in said coils with which the selected conductor is linked to give information that is related solely to the subscriber's telephone station having the same number as the said selected conductor.

4. In a telephone switching system, the combination with a plurality of coils, of a plurality of conductors each identified with one of a group of directory numbers of subscribers' telephone stations, each conductor being inductively linked with a selected combination of coils, a source of current, means to selectively establish, in accordance with the directory number, a connection between the said source and one of said conductors, and means responsive to the voltage induced in said coils with which the selected conductor is linked to give information that is related solely to the subscriber's telephone station with which the said selected conductor is identified.

5. In a telephone switching system, the combination with a coil, of a conductor identified with one of a group of subscribers' telephone stations, and inductively linked with said coil, a source of current, means to establish a connection between the said source and said conductor, and means responsive to the voltage induced in said coil with which the said conductor is linked to give information that is related to the subscriber's station with which the said conductor is identified.

6. In a telephone switching system, apparatus for locating the position therein of the hold magnet of a called subscriber's station comprising, in combination, a plurality of coils, a plurality of numbered conductors each representing one of a group of directory numbers of subscribers' telephone stations, each conductor being inductively linked with a selected combination of coils, said selected combinations of coils being discrete, a source of current, means responsive to the dialing of the directory number of a called subscriber's station to selectively establish a connection between the said source and the conductor bearing the directory number of the called subscriber's station to transmit a surge of current over the selected conductor, and means responsive to the voltage induced in said coils with which selected conductor is linked to indicate the position in said switching system of the hold magnet of the called station.

7. In a telephone switching system, apparatus for locating the position therein of the hold magnet of a called subscriber's station comprising in combination a plurality of coils, a plurality of conductors each identified with one of a group of directory numbers of subscriber's telephone stations, each conductor being inductively linked with a selected combination of coils, a source of current, means responsive to the dialing of the telephone directory number of a called subscriber's station to selectively connect the said source to the conductor identified with the directory number of the called station to transmit a varying current over the selected conductor, and means responsive to the voltage induced in said coils with which said selected conductor is linked to indicate the position in said switching system of the hold magnet of the called station.

8. In a telephone switching system, apparatus for locating the position therein of the hold magnet of a called subscriber's station comprising, in combination, a plurality of coils arranged in groups, a plurality of conductors each identified with one of a group of directory numbers of subscribers' telephone stations and each inductively linked with a selected combination of coils, one coil from each of said groups, said selected combinations of coils being discrete, a source of current, means responsive to the dialing of the telephone directory number of a called subscriber's station to selectively connect the said source to the conductor identified with the directory number of the called subscriber's station to transmit a varying current over the selected conductor, and means responsive to the voltage induced in said coils with which said selected conductor is linked to indicate the position in said switching system of the hold magnet of the called subscriber's station.

9. In a telephone switching system, apparatus for locating the position therein of the hold magnet of a called subscriber's station comprising, in combination, a plurality of coils arranged in groups, a plurality of conductors each identified with one of a group of directory numbers of subscribers' telephone stations and each inductively linked with a selected combination of coils, one coil from each of said groups, a source of current, means responsive to the dialing of the telephone directory number of a called subscriber's station to selectively connect the said source to the conductor identified with the directory number of the called subscriber's station to transmit a varying current over the selected conductor, and means responsive to the voltage induced in said coils with which said selected conductor is linked to indicate the position in said switching system of the hold magnet of the called subscriber's station.

10. Apparatus for finding a wanted communication path in a group of paths which are connected to terminals in a telephone switching system and for indicating the location of the terminals of the wanted path comprising, in combination, a group of communication paths, a plurality of position-indicating coils to indicate the position of said terminals in said switching system, a control coil, a plurality of conductors each identified with the directory number of one path of a group of paths, said conductors being inductively linked with selected combinations of said position-indicating coils and the said control coil, said combinations being discrete, a source of varying current, switching means responsive to the dialing of the directory number of a wanted path to selectively connect said source to the conductor identified with the directory number of the wanted path, and means responsive to the voltage induced in said control coil by current from said source to disconnect said source from said selected conductor.

11. Apparatus for finding a wanted communication path in a group of such paths which are connected to terminals in a telephone switching system and for indicating the location of the terminals of the wanted path comprising, in combination, a group of communication paths over which a search is to be made to find the wanted path, a plurality of position-indicating coils to indicate the position of the terminals of said paths in said switching system, a control coil, a plurality of conductors each identified with the directory number of one of a group of paths, said conductors being inductively linked with selected combinations of said position-indicating coils and the said control coil, switching means responsive to the dialing of the directory number of a particular path to selectively connect said source to the conductor having the number of a particular path, and controlling means responsive to the voltage induced in said control coil by current from said source to disconnect said source from said selected conductor.

12. Apparatus for finding a wanted communication path in a group of such paths which are connected to terminals in a telephone switching system and for indicating the location of the terminals of the wanted path comprising, in combination, a group of communication paths over which a search is to be made to find the wanted path, all of said paths having directory numbers one of which is dialed, a plurality of position-indicating coils to indicate the position of said terminals in said switching system, a control coil, a plurality of conductors each identified with the directory number of one of a group of paths, said conductors being inductively linked with selected combinations of said position-indicating coils and the said control coil, said combinations being discrete, a source of electrical energy, switching means responsive to the dialing of the dialed directory number to select the conductor identified with the path having that directory number and to connect the said source to the selected conductor, means responsive to the voltage thus induced in said control coil to disconnect said source from the selected conductor, and means operative upon the disconnection of said generator to seek the first idle communication path in the group of such paths and to connect said source of energy to the conductor identified with the idle communication path.

13. Apparatus for finding a wanted communication path in a group of paths which are connected to terminals in a telephone switching system and for indicating the location of the terminals of the wanted path comprising, in combination, a group of communication paths, a plurality of position-indicating coils to indicate the position of said terminals in said switching system, a control coil, a plurality of conductors each identified with the directory number of one path of a group of paths, said conductors being inductively linked with selected combinations of said position-indicating coils and the said control coil, said combinations being discrete, a source of varying current, switching means responsive to the dialing of the directory number of a wanted path to select the conductor identified with the directory number of the wanted path and to connect thereto the source of current, means responsive to the voltage induced in the position-indicating coils to indicate the position of the terminals of the wanted path and means responsive to the voltage induced in the control coil to disconnect said source of current from said selected conductor.

14. Apparatus for finding an idle communication path in a group of such paths which are terminated upon hold magnets in a telephone switching system and for indicating the location in said system of the hold magnet of said idle path, comprising, in combination, a group of communication paths, a plurality of position-indicating coils to indicate the position of the terminals of said paths, a control coil, a plurality of conductors each identified with the directory number of one of a group of paths, said conductors being inductively linked with a selected combination of said position-indicating coils and said control coil, said combinations being discrete, switching means responsive to the dialing of the directory number of a called path to selectively connect a source of electrical energy to that conductor identified with the number of the called path, indicating means responsive to the voltage induced in said position-indicating coils with which the selected conductor is linked to indicate the location upon a frame in said telephone switching system of the hold magnet of the communication path with which the selected conductor is identified, said indicating means comprising a gaseous discharge device and switching means controlled thereby, and means operated by the voltage induced in said control coil to disconnect said source of voltage from said selected conductor and to release said indicating means operated by voltage in said position-indicating coils.

15. Apparatus for finding an idle communication path in a group of such paths which are terminated upon hold magnets in a telephone switching system and for indicating the location in said system of the hold magnet of said idle path comprising, in combination, a group of communication paths, a plurality of position-indicating coils to indicate the position of the terminals of said paths, a control coil, a plurality of conductors each identified with the directory number of one of a group of paths, all of said conductors being inductively linked with a selected combination of said position-indicating coils and all of said conductors except one being linked with said control coil, said combinations being discrete, switching means responsive to the dialing of the directory number of a called path to selectively connect a source of electrical energy to that conductor identified with the number of the called path, indicating means responsive to the voltage induced in said position-indicating coils with which the selected conductor is linked to indicate the location upon a frame in said telephone switching system of the hold magnet of the communication path with which the selected conductor is identified, said indicating means comprising a gaseous discharge device and switching means controlled thereby, and means operated by the voltage induced in said control coil to disconnect said source of voltage from said selected conductor and to release said indicating means operated by voltage in said position-indicating coils.

16. Apparatus for finding an idle communication path in a group of such paths which are terminated upon hold magnets in a telephone switching system and for indicating the location of the hold magnet of said idle path comprising, in combination, a group of communication paths, a plurality of position-indicating coils, a control coil, a plurality of conductors each identified with the directory number of one of a group of said paths, said conductors being inductively linked with a selected combination of said position-indicating coils and the said control coil, said combinations being discrete, a source of voltage, switching means responsive to the dialing of the directory number of a called path to selectively connect the source of voltage to the conductor identified with the number of the called path, and controlling means responsive to the voltage induced in said control coil by current from said source to disconnect the source from said selected conductor, said controlling means comprising a gaseous discharge device operable by said voltage and a relay responsive to the operation of said tube.

17. In a telephone switching system, in combination, means to register the directory number of the telephone station of a called party, means to translate that number into an indication of the position of the hold magnet of said station upon a line-link frame of the switching system, said translating means comprising a plurality of conductors each identified with the hold magnet assigned to one of the stations, a plurality of coils with a selected combination of which the said conductors are linked, said combinations being discrete, means controlled by the registering means to select the conductor identified with the directory number of the called party's station and to apply thereto an electrical condition, and means responsive to the voltage thereby induced in said coils to indicate the position upon a frame of the hold magnet assigned to the called station.

18. In a telephone switching system, in combination, means to register the directory number of the telephone station of a called party, means to translate that number into an indication of the position of the hold magnet of said station upon a line-link frame of the switching system, said translating means comprising a plurality of conductors each identified with the hold magnet assigned to one of the stations, a plurality of coils with a selected combination of which the said conductors are linked, means controlled by said register means to select the conductor identified with the directory number of the called party's station and to apply thereto an electrical condition, and means responsive to the voltage thereby induced in said coils to indicate the position upon said frame of the hold magnet assigned to the called station.

19. Apparatus for finding an idle trunk in a group of trunks which are terminated upon hold magnets in a telephone switching system and for indicating therein the location of the hold magnet of said idle trunk, comprising in combination, a group of trunks, a plurality of position-indicating coils, a control coil, a plurality of conductors each identified with the directory number of one of the group of trunks, said conductors being inductively linked with a selected combination of said position-indicating coils and said control coil, said combinations being discrete, switching means responsive to the dialing of the directory number of a called trunk to selectively connect a source of electrical energy to that conductor identified with the number of the called trunk, controlling means responsive to the voltage induced in said control coil by the said source of energy to disconnect said source from said selected conductor, selecting means responsive to said controlling means to find an idle trunk in said group of trunks, means controlled by said selecting means to connect said source of energy to that conductor having the same number as the said idle trunk, and means responsive to the voltage induced in the position-indicating coils with which said latter conductor is linked to indicate the location in said telephone switching system of the hold magnet of said idle trunk.

20. Apparatus for finding an idle trunk in a group of trunks which are terminated upon hold magnets individual to each trunk in a telephone switching system and for indicating the location of the hold magnet of said idle trunk, comprising, in combination, an inductive translating device to translate the directory number of the called trunk to an indication of the position of the hold magnet of that trunk upon a frame, said translating device comprising a plurality of position-indicating coils, and a control coil, a plurality of conductors each identified with one of said trunks, each conductor being inductively linked to a combination of said coils, a source of electrical energy, switching means responsive to the dialing of the desired directory number to select that conductor identified with the said directory number and to connect said source thereto, controlling means responsive to the voltage induced in the said control coil to disconnect the source of energy and to release the switching means associated with the said position-indicating coils, means controlled by said control coil to test each of said trunks, and means operated upon the finding of an idle trunk to connect the source of voltage to the conductor identified with the said idle trunk whereby a varying current will flow over the said conductor and means responsive thereto to indicate the position of the hold magnet of the idle trunk.

21. Apparatus for finding an idle trunk in a group of trunks which are terminated upon hold magnets in a telephone switching system and for indicating the location of the hold magnet of said idle trunk, comprising, in combination, an induction translator comprising a plurality of coils to translate the directory number of the idle trunk to an indication of the position of its hold magnet upon a frame in said switching system, a plurality of conductors each corresponding numerically to one of said trunks, each conductor being inductively linked to a combination of the translator coils and a control coil, the said combinations being discrete, switching means responsive to the dialing of the called party's directory number to selectively apply a voltage to the conductor identified with the dialed number, controlling means responsive to the voltage induced in said control coil to effect the disconnection of the said source from the selected conductor, means responsive to the said controlling means to test for an idle condition each of the trunks of said group one after another, means responsive to the finding of an idle trunk to apply a voltage to the conductor having the same number as the said idle trunk, and means responsive to the voltage induced in the translator coils to indicate the position of the hold magnet of the idle trunk in the said switching system.

22. In a telephone switching system, in combination, a plurality of groups of trunk circuits, a plurality of coils, a plurality of conductors each identified with one of said groups of trunk circuits and interlinked inductively with a selected combination of said coils, switching apparatus responsive to a dialed number to selectively connect a source of electrical energy to one of said conductors to identify one of said groups of trunk circuits, controlling means responsive to the voltages induced in said coils interlinked by said selected conductor to select an idle trunk of said identified group of trunks.

23. In a telephone switching system, in combination, a plurality of groups of communication paths, a plurality of inductive coils, a plurality of conductors each operatively interconnected with one of said groups of paths and inductively interlinking a selected plurality of said coils, switching means responsive to telephone dial signals to select one of said conductors, means to apply a surge of electrical energy to said selected conductor, control devices responsive to said surge of electrical energy connected to said conductor to select an idle one of said paths, a conductor individually operatively interconnected to each of said paths and interlinking a selected group of said coils, apparatus controlled by the selection of an idle trunk to apply a surge of electrical energy to the conductor individual to said selected path, and means responsive to voltages induced in said coils responsive to said surge to indicate the location of said path.

24. Apparatus for finding an idle trunk in a group of trunks which are terminated upon hold magnets in a telephone switching system and for indicating therein the location of the hold magnet of the idle trunk, comprising in combination, a group of trunks in which a search for an idle one is to be made, a plurality of position-indicating coils, a hunt coil, a plurality of conductors each identified with the directory number of one of said group of trunks, each conductor being inductively linked with a selected combination of said position-indicating coils and all except the last conductor in the group being also linked with said hunt coil, said combinations being discrete, a hunt terminal strip upon which all conductors of said group except the last conductor in the group are terminated, a non-hunt terminal strip upon which the last conductor in the group is terminated, switching means responsive to the dialing of the directory number of the called trunk to select the conductor identified with that trunk and to connect thereto a source of varying current, said switching means being arranged to ground the terminal of the hunt terminal strip, a hunt relay responsive to the voltage induced by the varying current in the hunt coil with which said conductor is linked to disconnect said source from said selected conductor, means responsive to the operation of said hunt relay to apply a voltage to the terminals of the hunt terminal strip, means to search for an idle trunk in said group of trunks, said searching means including a group of relays each operated by the application of the voltage to the terminals of the hunt terminal strip, a group of sleeve relays each connected to the hold magnet of a trunk of the group and operated whenever the connected trunk is idle, means operated upon the finding of an idle trunk within said group of trunks to ground the terminals of the hunt terminal strip, and means operated upon the grounding of said terminals to transmit a varying current over the conductor identified with said idle trunk whereby the location in said switching system of the hold magnet of that trunk may be determined.

25. Apparatus for finding an idle trunk in a group of trunks which are terminated upon hold magnets in a telephone switching system and for indicating therein the location of the hold magnet of the idle trunk, comprising in combination, a group of trunks in which a search for an idle one is to be made, a plurality of position-indicating coils, a hunt coil, a plurality of conductors each identified with the directory number of one of said group of trunks, each of said conductors being inductively linked with a selected combination of said position-indicating coils and all except the last conductor in the group being also linked with said hunt coil, said combinations being discrete, a hunt terminal strip upon which all conductors except the last conductor of said group are terminated, switching means responsive to the dialing of the directory number of the called trunk to select that conductor which is identified with the called trunk and to connect thereto a source of varying current, said switching means being arranged to ground the terminal of the hunt terminal strip, a hunt relay responsive to the voltage induced by the varying current in the hunt coil with which said conductor is linked to disconnect said source from the selected conductor, means responsive to the operation of said hunt relay to apply a voltage to the terminals of the hunt terminal strip, means to search for an idle trunk in a group of trunks, said searching means including a group of relays operated by the application of the voltage to the terminals of the hunt terminal strip to set the limits over which the search is to be made, a group of sleeve relays each connected to the hold magnet of a trunk and operated whenever the connected trunk is idle, means operated upon the finding of an idle trunk within said limits to ground the terminals of the hunt terminal strip, and means operated upon the grounding of said terminals to transmit a varying current over the conductor identified with said idle trunk whereby the location in said switching system of the hold magnet of that trunk may be determined.

26. Apparatus for finding an idle trunk in a group of trunks which are terminated upon hold magnets in a telephone switching system and for indicating the location therein of the hold magnet of the idle trunk, comprising in combination, a group of trunks over which a search is to be made, a plurality of position-indicating coils, a hunt coil, a plurality of conductors each identified with the directory number of one of the group of trunks, each conductor being inductively linked with a selected combination of said position-indicating coils and all except one of said conductors being also linked with said control coil, said combinations being discrete, a hunt terminal strip to which all conductors of said group except the last conductor is connected, switching means responsive to the dialing of the directory number of the called trunk to select the conductor identified with that trunk, to ground said conductor and to connect a source of varying current to the selected conductor, controlling means responsive to the voltage induced in said hunt coil to disconnect said sources of current from said selected conductor, means responsive to the voltage induced in the hunt coil to apply a potential to the terminals of the hunt terminal strip to which all of said conductors except the last are connected to indicate the trunks to be tested for an idle one, means responsive to the finding of an idle trunk to remove the potential from the hunt terminal strip and to ground the terminals thereof, and means to connect said source of varying current to the conductor identified with said idle trunk whereby an indication may be obtained of the location of the terminals of said trunk in the telephone switching system.

27. In a telephone switching system in which the trunks extending to a given P. B. X are arranged in groups that are terminated upon different tens blocks of terminals, said groups being non-consecutive, apparatus for testing for an idle trunk in the second group when all trunks in the first group test busy, comprising in combination, means to register the directory number of the called trunk, an induction translator including a plurality of position-indicating coils and a control coil, a plurality of relays each controlled by one of said coils, and a plurality of conductors each inductively linked with a selected combination of said coils to translate the number of the called line to an indication of the location of its terminals in said switching system, said combinations being discrete, means to select the conductor identified with the called line and to transmit thereover a varying current, means responsive to the transmission of said current to apply a potential to all except the last conductor identified with the trunks of the first group, means to test for an idle trunk among all trunks identified with the conductors to which the potential has been applied, means operative when no idle trunk is found in the first group to remove the potential from said conductors and to ground those conductors, means to transmit a varying current over the conductor identified with the last trunk of the first group to induce a voltage in the coils linked therewith and to effect the operation of position-indicating relays connected to said coils to provide identifying data as to the location of the terminals of the first trunk of the next group of trunks, means employing said identifying data to register the number of the first trunk of the second group thus identified, means controlled by such registration to select the conductor identified with the first trunk of the second group of trunks and to restore to normal all relays of said translator, means to apply a potential to the conductors identified with the trunks of the second group, means responsive to the finding of an idle trunk in the second group to remove the potential from the conductors identified with the trunks of the second group and to ground the said conductors, and means to select the conductor identified with the idle trunk of the second group and to transmit a varying current thereover.

28. Apparatus for finding an idle trunk in a group of trunks which are terminated upon hold magnets in a telephone switching system and for indicating therein the location of the hold magnet of the idle trunk, comprising in combination, a group of trunks, an induction translator including a plurality of position-indicating coils and a control coil and a plurality of conductors inductively linked with selected combinations of said coils, said combinations being discrete, a hunt terminal strip to which said conductors are connected, a source of varying current, means responsive to the registration of the number of a particular trunk to ground the conductor identified with the called trunk and to effect the transmission of a varying current over said conductor, means responsive to the transmission of the varying current through the control coil of the translator to disconnect the source of said current and to apply a potential to the terminals of the hunt terminal strip, means also responsive to the transmission of the surge through the control coil of the said translator to effect a search for an idle trunk in the group of trunks with which said conductors are identified, and means responsive to the finding of an idle trunk in said group to ground the terminals of the hunt terminal strip and to cause the transmission of a varying current over the conductor identified with the idle trunk.

29. In a system for translating the directory number of a telephone station into an indication of the location in a telephone switching system of the hold magnet with which said station is identified, the combination of an induction translator including a plurality of position-indicating coils and a control coil, a plurality of conductors inductively linked with said coils, certain of said conductors being identified with P. B. X stations and other conductors being identified with non-P. B. X stations, a hunt terminal strip to which is connected the group of conductors identified with a given P. B. X except the last conductor of the group, a non-hunt terminal strip to which are connected all conductors identified with non-P. B. X stations and also the last conductor of a group identified with a P. B. X station, means to select the conductor identified with a wanted non-P. B. X station and to ground the terminals of the non-hunt terminal strip, said selecting means effecting the transmission of a surge of current over the selected conductor, controlling means responsive to the transmission of a surge of current over a conductor identified with a P. B. X station and linked with the control coil to apply a potential to the terminals of the hunt terminal strip and to search for an idle trunk in the group extending to a given P. B. X, means responsive to the finding of an idle trunk to remove said potential and ground the terminals of the hunt terminal strip and to transmit a surge of current over the conductor identified with the idle trunk.

30. In a system for translating the directory numbers of non-P. B. X stations and P. B. X stations into indications of the location in a telephone switching system of the hold magnets identified with said stations, in combination, an induction translator including a plurality of coils, a plurality of conductors inductively linked with said coils, certain of said conductors being identified with non-P. B. X stations and others being identified with P. B. X stations, a non-hunt terminal strip to which are connected those conductors identified with non-P. B. X stations, a hunt terminal strip to which are connected those conductors identified with P. B. X stations, means to select one of said conductors, circuits controlled by said selecting means to transmit a varying current over the selected conductor, means operative when the called station is a P. B. X station to apply a potential to the hunt terminal strip and to search for an idle path in the group of paths extending to a given P. B. X and means operative upon the finding of an idle path to ground the terminals of the hunt terminal strip and to transmit a varying current over the conductor identified with the idle path.

31. In a system to translate the directory number of a telephone station to an indication of the location of the terminals of that station in a telephone switching system, the combination of a plurality of coils, a plurality of conductors inductively linked with selected combinations of said coils, said combinations being discrete, a plurality of stations each identified with one of said conductors, a source of varying current, means to select one of said conductors and to connect it to said source of current, controlling means responsive to the transmission of current over the selected conductor to apply a potential to a terminal of each of said conductors and also to find an idle station among said plurality of stations, means responsive to the finding of an idle station to remove said potential from said terminal of each conductor and to connect said source of current to the conductor identified with said idle station, and means responsive to the voltage induced in the coils with which said latter conductor is linked to indicate the location of the terminals of the idle station.

32. In a system to translate the directory number of a telephone station to an indication of the location of the terminals of that station in a telephone switching system, the combination of a plurality of coils, a plurality of conductors inductively linked with selected combinations of said coils, a plurality of stations each identified with one of said conductors, a source of varying current, means to select one of said conductors and to connect it to said source of current, controlling means responsive to the transmission of current over the selected conductor to apply a potential to a terminal of each of said conductors and also to find an idle station among said plurality of stations, means responsive to the finding of an idle station to remove said potential from said terminal of each conductor and to connect said source of current to the conductor identified with said idle station, and means responsive to the voltage induced in the coils with which said latter conductor is linked to indicate the location of the terminals of the idle station.

33. Apparatus for finding an idle trunk in a group of trunks which are terminated upon hold magnets in a telephone switching system and for indicating therein the location of the hold magnet of the idle trunk, comprising in combination, a group of trunks, an induction translator including a plurality of position-indicating coils and a control coil and a plurality of conductors inductively linked with selected combinations of said coils, said combinations being discrete, a hunt terminal strip to which said conductors are connected, a source of varying current, means responsive to the registration of the number of a particular trunk to ground the conductor identified with the called trunk and to effect the transmission of a varying current over said conductor, means to disconnnect the source of varying current from said conductor and to apply a potential to the terminals of the hunt terminal strip, means to hunt for an idle trunk in said group of trunks with which said conductors are identified, and means responsive to the finding of an idle trunk to ground the terminals of the hunt terminal strip and to cause the transmission of a varying current over the conductor identified with the idle trunk.

34. The invention defined by claim 33 further characterized by means responsive to the transmission of current over the conductor identified with the idle trunk to indicate the location in the switching system of the hold magnet of the idle trunk.

35. In a telephone switching system in combination, an induction translator having a plurality of coils and a plurality of conductors each inductively linked with a selected combination of said coils and each identified with one of a group of transmission paths, a terminal strip upon which each of said conductors is terminated, means to select one of said conductors and to ground the terminal upon said strip to which the selected conductor is connected, said selecting means being arranged to apply a varying current to said conductor, means responsive to the voltage induced in the coils with which the selected conductor is linked to apply a potential to the terminals of the terminal strip to which the conductors are connected, means to remove said potential and to ground the terminals of said terminal strip upon the finding of an idle transmission path, and means to transmit a varying current over the conductor identified with the idle path.

36. In a dial-controlled telephone switching system a translating arrangement to translate dial signals representing the directory number of a called station to indicia of the location of a transmission path extending towards said called station comprising in combination, a plurality of coils, a plurality of conductors inductively linked with selected combinations of said coils, operative interconnections between each conductor and respective ones of said paths, a conductor identified with a group of said paths also inductively linked with a selected combination of said coils, selective means controlled by dial signals to select one of said conductors and to connect it to a source of electrical current, controlling means responsive to the transmission of current over the selected conductor to apply a potential to a terminal of each of said conductors interconnected with the paths of a group of said paths, apparatus responsive to said potential to find an idle path of said group, and means responsive to the finding of an idle path to remove said potential from said terminals and to connect said source of current to the conductor interconnected with said idle path, and means responsive to the voltages induced in the coils with which said latter conductor is linked to indicate the location of terminals of said idle path.

THOMAS L. DIMOND.

REFERENCES CITED

The following references are of record in the file of this patent:

UNITED STATES PATENTS

| Number | Name | Date |
|---|---|---|
| 2,351,551 | Seibel | June 13, 1944 |
| 2,490,441 | Joel | Dec. 6, 1949 |
| 2,510,061 | Branson et al. | June 6, 1950 |